US012804772B2

(12) United States Patent
Seo et al.

(10) Patent No.: US 12,804,772 B2
(45) Date of Patent: Nov. 17, 2026

(54) ELECTRONIC DEVICE PROVIDING WALKIE-TALKIE SERVICE USING SHORT-RANGE WIRELESS COMMUNICATION NETWORK

(71) Applicant: SAMSUNG ELECTRONICS CO., LTD., Suwon-si (KR)

(72) Inventors: Hyoungmin Seo, Suwon-si (KR); Laehoon Kim, Suwon-si (KR); Sanghwan Park, Suwon-si (KR); Satish Kumar Reddy Palli, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 233 days.

(21) Appl. No.: 18/397,546

(22) Filed: Dec. 27, 2023

(65) Prior Publication Data

US 2024/0292491 A1 Aug. 29, 2024

(30) Foreign Application Priority Data

Jan. 3, 2023 (KR) ........................ 10-2023-0000897
Jul. 13, 2023 (KR) ........................ 10-2023-0091228

(51) Int. Cl.
*H04W 76/45* (2018.01)
*H04W 4/10* (2009.01)
*H04W 88/04* (2009.01)

(52) U.S. Cl.
CPC ............. *H04W 76/45* (2018.02); *H04W 4/10* (2013.01); *H04W 88/04* (2013.01)

(58) Field of Classification Search
CPC ........ H04W 76/45; H04W 4/10; H04W 88/04
See application file for complete search history.

(56) References Cited

U.S. PATENT DOCUMENTS

| | | | | |
|---|---|---|---|---|
| 7,382,786 | B2 | 6/2008 | Chen et al. | |
| 11,013,062 | B2 | 5/2021 | Srivastava et al. | |
| 2022/0078584 | A1* | 3/2022 | Chen | H04W 4/80 |

FOREIGN PATENT DOCUMENTS

| | | |
|---|---|---|
| KR | 10-0295057 | 7/2001 |
| KR | 10-0679392 | 2/2007 |

(Continued)

OTHER PUBLICATIONS

Valter Ronnholm, 'Push-to-Talk over Bluetooth', 2006, Proceedings of the 39th Hawaii International Conference on System Sciences, pp. 1-10. (Year: 2006).*

(Continued)

*Primary Examiner* — Melvin C Marcelo
(74) *Attorney, Agent, or Firm* — FISH & RICHARDSON P.C.

(57) ABSTRACT

The present disclosure relates to electronic devices that provide walkie-talkie service. One example electronic device includes a communication chip including a Bluetooth circuit for supporting Bluetooth communication, and a processor including a walkie-talkie circuit for performing a walkie-talkie operation with a walkie-talkie group, including a plurality of Bluetooth devices, by using the Bluetooth circuit. The walkie-talkie circuit includes a walkie-talkie control circuit configured to generate setting information related to the walkie-talkie operation, and a walkie-talkie processing circuit configured to set values of parameters of a plurality of operations for the walkie-talkie operation based on the setting information, and generate second walkie-talkie data by processing first walkie-talkie data received from the walkie-talkie group through the plurality of operations.

20 Claims, 21 Drawing Sheets

(56) References Cited

FOREIGN PATENT DOCUMENTS

| | | |
|---|---|---|
| KR | 10-2007-0067438 | 6/2007 |
| KR | 10-2007-0073288 | 7/2007 |
| KR | 10-2080937 | 2/2020 |

OTHER PUBLICATIONS

JRC Publications Repository, 'The Future of Semiconductor Intellectual Property Architectural Blocks in Europe', Abstract only, 2009. (Year: 2009).*

* cited by examiner

ELECTRONIC DEVICE PROVIDING WALKIE-TALKIE SERVICE USING SHORT-RANGE WIRELESS COMMUNICATION NETWORK

CROSS-REFERENCE TO RELATED APPLICATIONS

This application claims priority under 35 U.S.C. § 119 to Korean Patent Application Nos. 10-2023-0000897, filed on Jan. 3, 2023, and 10-2023-0091228, filed on Jul. 13, 2023, in the Korean Intellectual Property Office, the disclosures of which are incorporated by reference herein in their entireties.

BACKGROUND

With the development of wireless communication technology, electronic devices may communicate with other electronic devices through various wireless communication technologies. Bluetooth communication technology is short-range wireless communication technology in which electronic devices may be connected to each other to exchange data or information. The Bluetooth communication technology may include Bluetooth legacy (or classic) network technology or a Bluetooth low energy (BLE) network and may have a topology of various connection types such as a piconet and a scatternet. Electronic devices may share data with each other at low power using Bluetooth communication technology. Using this Bluetooth technology, external Bluetooth devices may be connected to one electronic device that is a host, and services based on applications running on the electronic devices may be provided to users. Recently, Bluetooth devices have been expanding into various categories such as wearable devices and Internet of things devices.

SUMMARY

The present disclosure relates to electronic devices, including an electronic device that operates as a host to provide multilateral call services with enhanced multilateral dialogue quality or sound solutions by connecting to multiple devices based on a short-range wireless communication network.

In some implementations, an electronic device includes a communication chip including a Bluetooth module for supporting Bluetooth communication, and a processor including a walkie-talkie circuit for performing a walkie-talkie operation with a walkie-talkie group including a plurality of Bluetooth devices by using the Bluetooth module, wherein the walkie-talkie circuit includes a walkie-talkie control circuit configured to generate setting information related to the walkie-talkie operation, and a walkie-talkie processing circuit configured to set values of parameters of a plurality of operations for the walkie-talkie operation on the basis of the setting information, and generate second walkie-talkie data by processing the first walkie-talkie data received from the walkie-talkie group through the plurality of operations.

In some implementations, an operation method of an electronic device performing a walkie-talkie operation with a walkie-talkie group includes a plurality of Bluetooth devices, the operation method including collecting a plurality of pieces of information related to the walkie-talkie operation, generating setting information based on the plurality of pieces of information, setting values of parameters of a plurality of operations for the walkie-talkie operation on the basis of the setting information, generate second walkie-talkie data by processing first walkie-talkie data received from the walkie-talkie group through the plurality of operations, and transmitting the second walkie-talkie data to the walkie-talkie group.

In some implementations, an electronic device including a communication chip includes a Bluetooth module for supporting Bluetooth communication, and a processor including a plurality of intellectual properties (IPs) for performing a walkie-talkie operation with a walkie-talkie group including a plurality of Bluetooth devices by using the Bluetooth module, wherein at least two IPs among the plurality of IPs are configured to partitively take charge of a plurality of operations for processing first walkie-talkie data received from the walkie-talkie group, and the at least two IPs are configured to alternately process the first walkie-talkie data.

BRIEF DESCRIPTION OF THE DRAWINGS

Implementations of the present disclosure will be more clearly understood from the following detailed description, taken in conjunction with the accompanying drawings.

DETAILED DESCRIPTION

Figure 1:
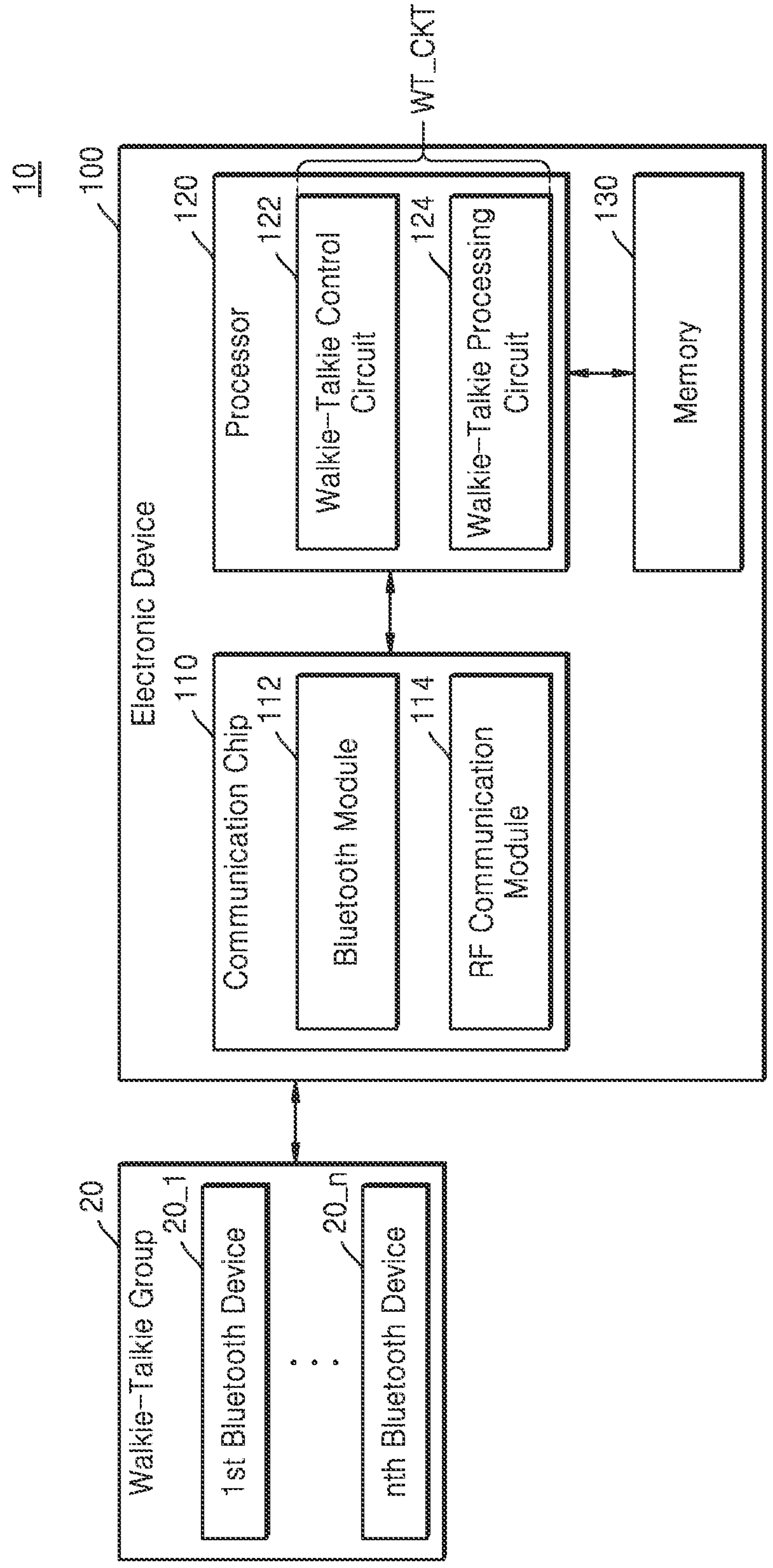
FIG. 1 is a block diagram illustrating an example wireless communication system.

FIG. 1 is a block diagram illustrating an example wireless communication system 10. In FIG. 1, the wireless communication system 10 may support short-range wireless communication networks and radio frequency (RF) communication networks (or long-range communication networks). Meanwhile, although it is fully understood that the short-range wireless communication network supported by the wireless communication system 10 is mainly described as a Bluetooth communication network, this is only an example, and the concepts described herein may be applied to various types of short-range wireless communication networks in addition to the Bluetooth communication network. For example, a near field communication network to which the concept is applied may correspond to a wireless personal area network (WPAN) or a wireless local area network (WLAN). Specifically, the WPAN may include Bluetooth or Zigbee, and the wireless local area network (LAN) may include Wireless Fidelity (Wi-Fi). In some implementations, the concept may also be applied to wireless body area network (WBAN), radio frequency identification (RFID), and near field communication (NFC).

Referring to FIG. 1, the wireless communication system 10 may include a walkie-talkie group 20 and an electronic device 100. In an implementation, the electronic device 100 may operate as a host that is connected to the walkie-talkie group 20 through a Bluetooth communication network to provide a walkie-talkie service to multiple users. In the present specification, walkie-talkie may be defined as a multilateral call method capable of simultaneously transmitting and receiving a call without pressing a hook switch for the call.

In an implementation, the walkie-talkie group 20 may include first to nth Bluetooth devices 20_1 to **20_*n*. The first to nth Bluetooth devices 20_1 to 20_*n* may include devices worn by users to provide a walkie-talkie service to the users. In this specification, the walkie-talkie service may be defined as a service provided by the electronic device 100 so that users wearing the first to nth Bluetooth devices 20_1 to 20_*n* may have conversations. For example, at least two of the first to nth Bluetooth devices 20_1 to 20_*n* may be paired with each other. Specifically, the first Bluetooth device 20_1 corresponds to a right earphone (e.g., an earphone worn on the right ear), and the second Bluetooth device 20_2 corresponds to a left earphone (e.g., an earphone worn on the left ear), so the first and second Bluetooth devices 20_1 and 20_2 may be paired with each other. In addition, for example, the first to nth Bluetooth devices 20_1 to 20_*n*** may include wearable devices or IoT devices equipped with microphone and speaker configurations, respectively.

In an implementation, the electronic device 100 may include a communication chip 110, a processor 120, and a memory 130. The electronic device 100 of FIG. 1 includes only minimum components, the communication chip 110, the processor 120, and the memory 130, for providing a walkie-talkie service. However, the electronic device 100 is not limited thereto, and the electronic device 100 may be variously implemented to perform an operation according to the concept.

In an implementation, the communication chip 110 may support wireless communication between the electronic device 100 and the walkie-talkie group 20 or an external electronic device. The communication chip 110 may include at least one communication processor that operates independently of the processor 120 and supports wireless communication. The communication chip 110 may include a Bluetooth module 112 and a radio frequency (RF) communication module 114. The Bluetooth module 112 may communicate with the walkie-talkie group 20 through a Bluetooth communication network, and the RF communication module 114 may communicate with at least one external electronic device through an RF communication network (e.g., a legacy cellular network, a long term evolution (LTE) network, a new radio (NR) network, a next-generation network, or the like). In this specification, examples in which the walkie-talkie operation is performed using a Bluetooth communication network are disclosed, but this is only an example and is not limited thereto, and the walkie-talkie operation may be performed using another type of short-range communication network, in which the Bluetooth module 112 may be replaced by the corresponding short-range communication module.

In an implementation, the processor 120 may include a walkie-talkie control circuit 122 and a walkie-talkie processing circuit 124. In this specification, a component including the walkie-talkie control circuit 122 and the walkie-talkie processing circuit 124 may be referred to as a walkie-talkie circuit WT_CKT. The walkie-talkie circuit WT_CKT may be driven when the walkie-talkie program is executed by the processor 120. The walkie-talkie circuit WT_CKT may be implemented in various ways within the processor 120 in software, hardware, or a combination of software/hardware. For example, the processor 120 may include a plurality of intellectual properties (IPs). Specifically, the processor 120 may include a main processor (e.g., a central processing unit (CPU) or an application processor) or an auxiliary processor (e.g., a graphics processing unit (GPU), a neural processing unit (NPU), or a digital signal processor (DSP)) that may operate independently of or together with the CPU. In at least one of the main processor and the auxiliary processor of the processor 120, the walkie-talkie circuit WT_CKT may be implemented in software, hardware, or a combination of software/hardware.

In an implementation, the walkie-talkie control circuit 122 may generate setting information related to a walkie-talkie operation such that the electronic device 100 may effectively perform a walkie-talkie operation with the walkie-talkie group 20. For example, the walkie-talkie control circuit 122 may generate setting information based on information received through a plurality of paths. Specifically, the walkie-talkie control circuit 122 may generate setting information based on at least one of first information received from at least one of multiple users through a user interface of the electronic device 100, second information received from the walkie-talkie group 20 worn on multiple users, and third information received from an internal component of the electronic device 100. In some implementations, the setting information may further include information defined in the Bluetooth protocol or conforming to a preset convention.

In an implementation, the walkie-talkie processing circuit 124 may set values of parameters of multiple operations for walkie-talkie operation based on the setting information provided from the walkie-talkie control circuit 122 and process first walkie-talkie data received from the walkie-talkie group 20 through multiple operations to generate second walkie-talkie data. The electronic device 100 may transmit the second walkie-talkie data to the walkie-talkie group 20. In some configurations, the walkie-talkie processing circuit 124 may include a first walkie-talkie processing part taking charge of some of the plurality of operations and a second walkie-talkie processing part taking charge of the rest of the plurality of operations. For example, the first walkie-talkie processing part may be arranged on the side of a first IP included in the processor 120, and the second walkie-talkie processing part may be arranged on a second IP included in the processor 120. The first walkie-talkie processing part and the second walkie-talkie processing part may alternately operate to process the first walkie-talkie data. For example, the first walkie-talkie processing part may perform an operation according to a first operation in charge of the first walkie-talkie processing part, to process first walkie-talkie data, and provide the processed first walkie-talkie data to the second walkie-talkie processing part. The second walkie-talkie processing part may perform an operation according to a second operation in charge of the second walkie-talkie processing part to provide the processed first walkie-talkie data to the first walkie-talkie processing part again.

In this way, the electronic device 100 may perform a walkie-talkie operation by processing the first walkie-talkie data received from the walkie-talkie group 20 through the multiple operations using the walkie-talkie circuit WT_CKT, to generate the second walkie-talkie data, and by performing a plurality of operations of transmitting the second walkie-talkie data to the walkie-talkie group 20.

In an implementation, the walkie-talkie control circuit 122 may adaptively change setting information on the basis of information received through a plurality of paths while performing a walkie-talkie operation. The walkie-talkie processing circuit 124 may perform a processing operation on the first walkie-talkie data by changing a value of at least one parameter among a plurality of operations based on the changed setting information.

In an implementation, the memory 130 may store a variety of data used in an operation of the electronic device 100. For example, the data may include software and related commands or code. For example, the memory 130 may store a program for performing a walkie-talkie operation of the walkie-talkie circuit WT_CKT, or may store data on parameters of the plurality of operations required for the walkie-talkie circuit WT_CKT to operate. The memory 130 may include a volatile memory or a nonvolatile memory.

The electronic device 100 according to an implementation may provide an optimal walkie-talkie service for users wearing the first to nth Bluetooth devices 20_1 to 20_*n* by individually setting parameters of the plurality of operations and effectively processing walkie-talkie data through the plurality of operations.

Figure 2:
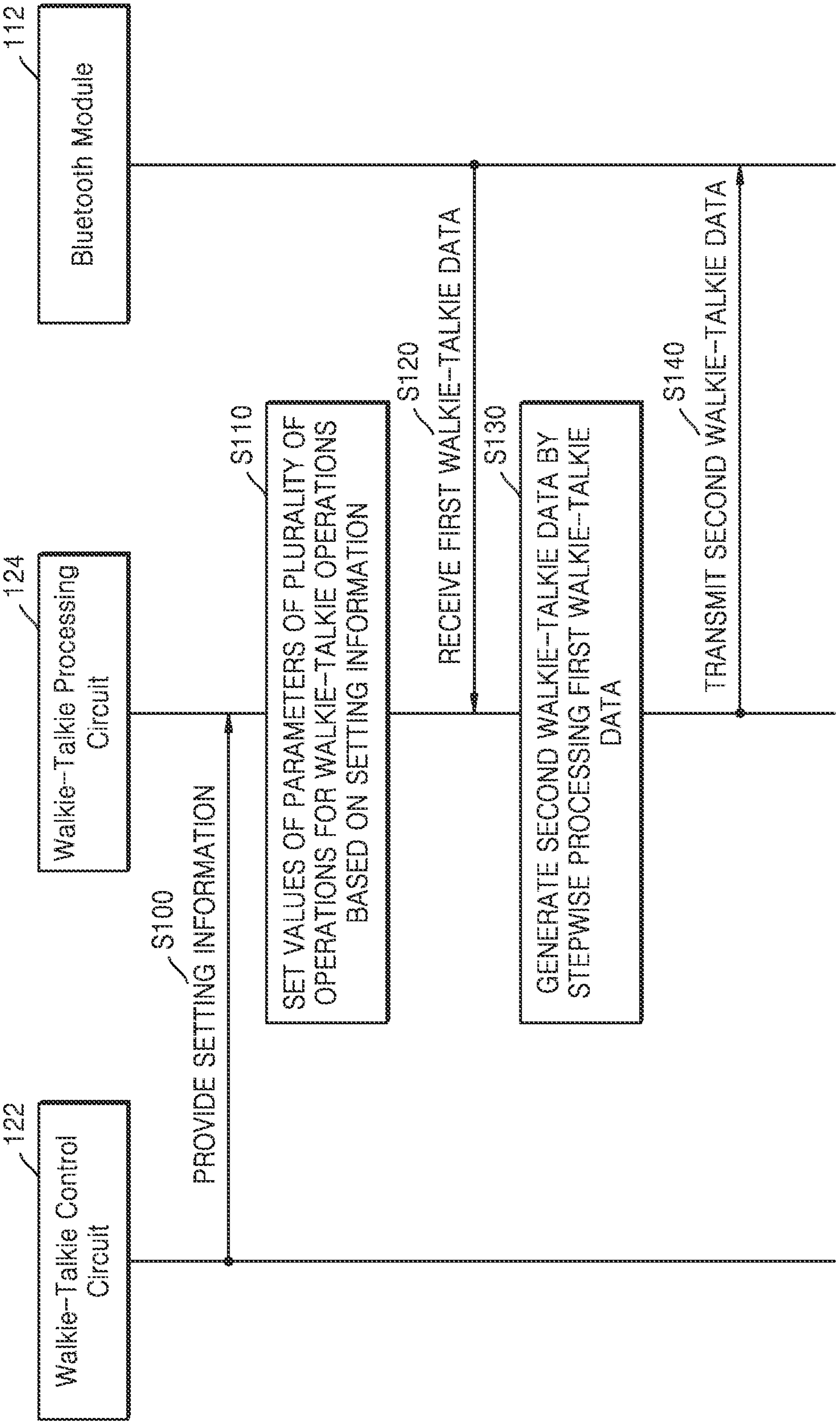
FIG. 2 is a flowchart illustrating an example method of operating the electronic device of FIG. 1.

FIG. 2 is a flowchart illustrating an example method of operating the electronic device 100 of FIG. 1. In FIG. 2, FIG. 1 is further referred to and described to help understanding.

Referring to FIG. 2, in operation S100, the walkie-talkie control circuit 122 may provide setting information to the walkie-talkie processing circuit 124. The walkie-talkie control circuit 122 may receive information for performing an effective walkie-talkie operation through a plurality of paths, and may generate setting information based on the received information.

In operation S110, the walkie-talkie processing circuit 124 may set values of parameters of the plurality of operations for walkie-talkie operation based on the setting information.

In operation S120, the walkie-talkie processing circuit 124 may receive the first walkie-talkie data from the Bluetooth module 112. The first walkie-talkie data is transmitted from the walkie-talkie group 20 and may include data input from users to microphone configurations of the first to nth Bluetooth devices 20_1 to 20_*n*.

In operation S130, the walkie-talkie processing circuit 124 may generate second walkie-talkie data by stepwise processing the first walkie-talkie data through the plurality of operations.

In operation S140, the walkie-talkie processing circuit 124 may transmit the second walkie-talkie data to the Bluetooth module 112. The second walkie-talkie data may be transmitted to the walkie-talkie group 20 through the Bluetooth module 112. The second walkie-talkie data may include data to be output to speaker configurations of the first to nth Bluetooth devices 20_1 to 20_*n*.

Figure 3:
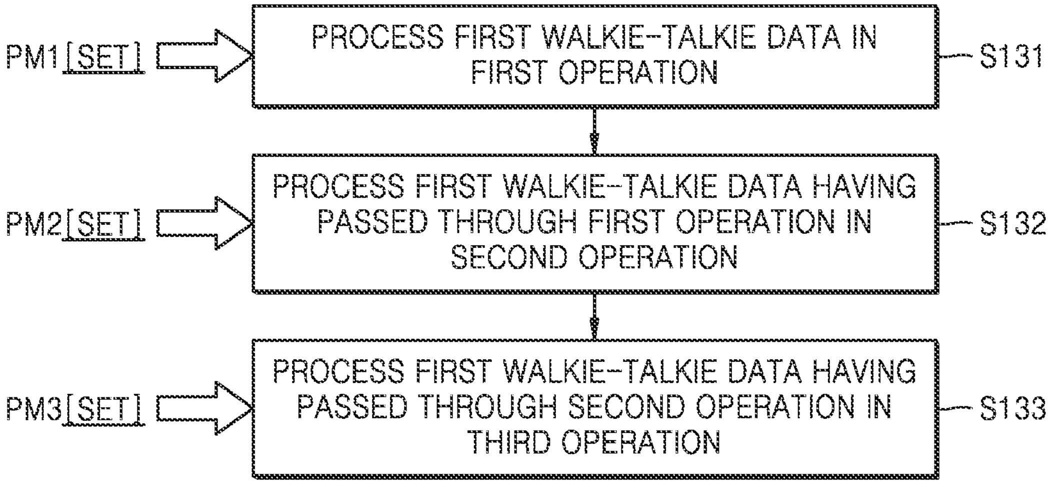
FIG. 3 is a flowchart illustrating a specific example of operation S130 of FIG. 2.

FIG. 3 is a flowchart illustrating a specific example of operation S130 of FIG. 2. In FIG. 3, an implementation in which a plurality of operations include first to third operations is disclosed, but this is only an implementation, and the plurality of operations may include more or less operations.

Referring to FIG. 3, in operation S131, the walkie-talkie processing circuit 124 may process first walkie-talkie data in the first operation. Before operation S131 is performed, a value of at least one first parameter PM1 in the first operation may be set based on the setting information.

In operation S132, the walkie-talkie processing circuit 124 may process the first walkie-talkie data that has passed through the first operation in the second operation. Before operation S132 is performed, a value of at least one second parameter PM2 in the second operation may be set based on the setting information.

In operation S133, the walkie-talkie processing circuit 124 may process the first walkie-talkie data that has passed through the second operation in the third operation.) Before operation S133 is performed, a value of at least one third parameter PM3 in the third operation may be set based on the setting information.

In an implementation, the first operation may be an operation of performing noise cancellation on the first walkie-talkie data. Specifically, the first walkie-talkie data includes data generated by the first to nth Bluetooth devices 20_1 to 20_*n*, and at least one first parameter PM1 may be set to apply a suitable noise cancellation method to each piece of the data of the first to nth Bluetooth devices 20_1 to 20_*n*.

In an implementation, the second operation may be an operation in which routing of the first walkie-talkie data is performed. Specifically, at least one second parameter PM2 may be set so that data included in the first walkie-talkie data may be properly routed and output through speaker configurations of the first to nth Bluetooth devices 20_1 to 20_*n* considering speakers and listeners between users.

In an implementation, the third operation may be an operation of adjusting the size of the first walkie-talkie data. In the present specification, the size of the data may be related to the volume of the voice output from the Bluetooth device. Specifically, at least one third parameter PM3 may be set so that pieces of data included in the first walkie-talkie data have a volume suitable for each user wearing the first to nth Bluetooth devices 20_1 to 20_*n*.

Figure 4:
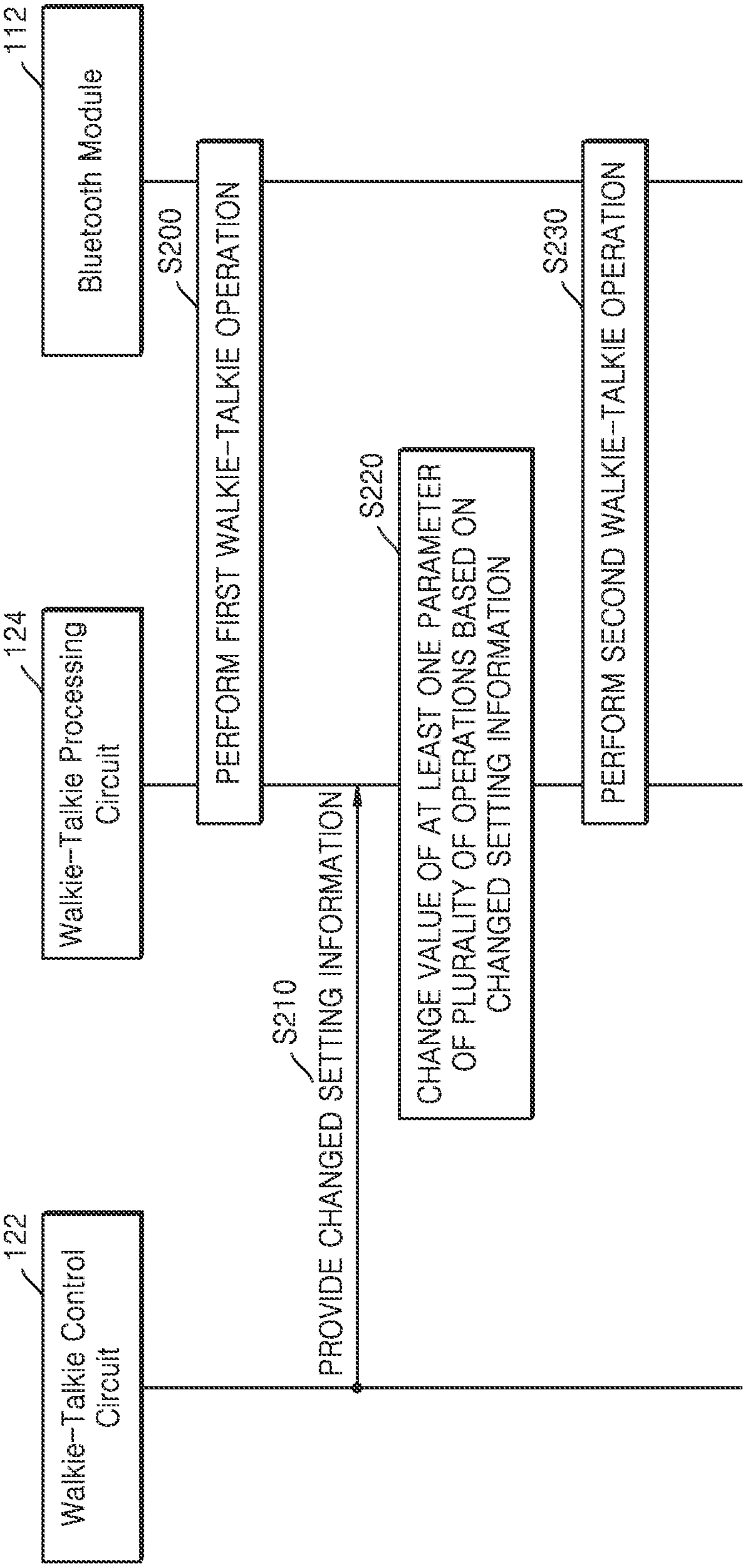
FIG. 4 is a flowchart illustrating another example method of operating the electronic device of FIG. 1.

FIG. 4 is a flowchart illustrating another example method of operating the electronic device of FIG. 1. In FIG. 4, FIG. 1 is further referred to and described to help understanding.

Referring to FIG. 4, in operation S200, the walkie-talkie processing circuit 124 may perform a first walkie-talkie operation in connection with the Bluetooth module 112. Specifically, the walkie-talkie processing circuit 124 may perform a first walkie-talkie operation of processing the first walkie-talkie data through a plurality of operations based on the setting information in FIG. 2 to generate the second walkie-talkie data, and then to transmit the generated second walkie-talkie data to the Bluetooth module 112.

In operation S210, the walkie-talkie control circuit 122 may provide the changed setting information to the walkie-talkie processing circuit 124. The walkie-talkie control circuit 122 may receive information to perform walkie-talkie operations periodically or aperiodically through the plurality of paths and may change setting information based on the received information.

In operation S220, the walkie-talkie processing circuit 124 may change the value of at least one of the plurality of operations based on the adaptively changed setting information while performing operation S200. Specifically, the walkie-talkie processing circuit 124 may perform individual updates on parameters of each of the plurality of operations based on the changed setting information.

In operation S230, the walkie-talkie processing circuit 124 may perform a second walkie-talkie operation of processing the first walkie-talkie data through the plurality of operations updated according to operation S220, in association with the Bluetooth module 112, to generate the second walkie-talkie data and then transmit the generated second walkie-talkie data to the Bluetooth module 112.

As described above, the optimal walkie-talkie service may be provided to users by reflecting the real-time changing walkie-talkie environment or Bluetooth communication environment through individual updates of each of parameters of the plurality of stages of the electronic device according to an implementation.

Figure 5:
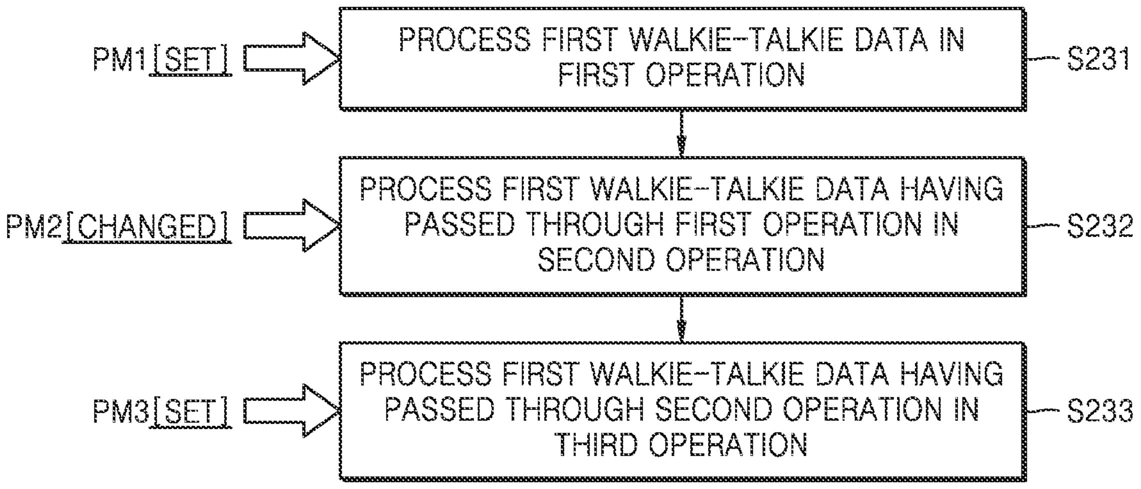
FIG. 5 is a flowchart illustrating a specific example of operation S230 of FIG. 4.

FIG. 5 is a flowchart illustrating a specific example of operation S230 of FIG. 4. In FIG. 5, an implementation in which a plurality of operations include first to third operations is disclosed, but this is only an implementation, and the plurality of operations may include more or less operations.

Referring to FIG. 5, in operation S231, the walkie-talkie processing circuit 124 may process first walkie-talkie data in the first operation. At least one first parameter PM1 in the first operation may not be changed and may be maintained at a previous value.

In operation S232, the walkie-talkie processing circuit 124 may process the first walkie-talkie data that has passed through the first operation in the second operation. Before operation S232 is performed, the value of at least one second parameter PM2 in the second operation may be changed based on the changed setting information.

In operation S233, the walkie-talkie processing circuit 124 may process the first walkie-talkie data that has passed through the second operation in the third operation. At least one third parameter PM3 in the third operation may not be changed and may be maintained at a previous value.

Figure 6A:
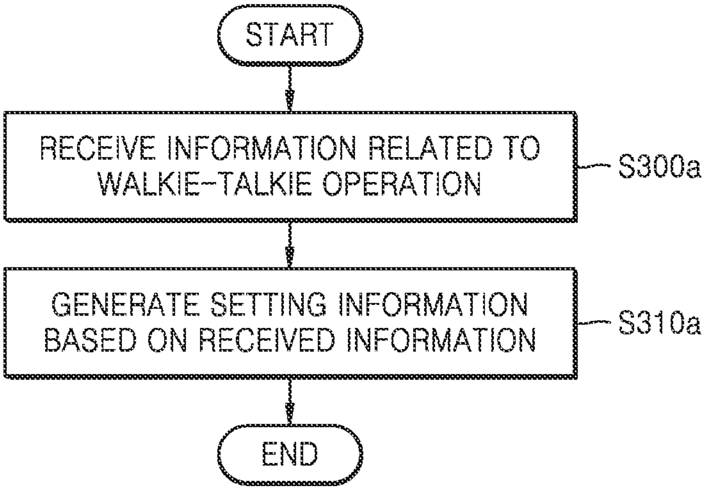
FIG. 6A is a flowchart illustrating an example method of generating setting information of a walkie-talkie control circuit.
Figure 6B:
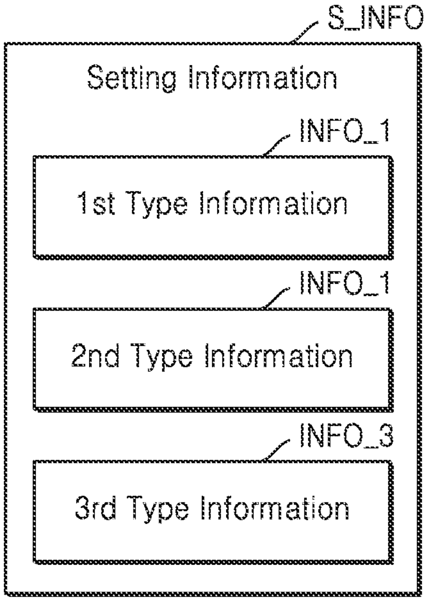
FIG. 6B is an example diagram for explaining setting information of FIG. 6A.

FIG. 6A is a flowchart illustrating an example method of generating setting information of a walkie-talkie control circuit, and FIG. 6B is an example diagram for explaining setting information of FIG. 6A.

Referring to FIG. 6A, in operation S300*a*, the walkie-talkie control circuit may receive information related to the walkie-talkie operation. The walkie-talkie control circuit may receive information related to the walkie-talkie operation through a plurality of paths. For example, the walkie-talkie control circuit may receive information on Bluetooth devices participating in a walkie-talkie service, information on customization of the walkie-talkie service, or information on the walkie-talkie environment, from any one of users through a user interface of an electronic device that is a host that provides the walkie-talkie service. In the present specification, information received through the user interface may be referred to as first information. For example, the walkie-talkie control circuit may receive biometric information of users used for walkie-talkie operations from a walkie-talkie group worn on a plurality of users, location information of the users, surrounding environment information where the users are located, or the like. In the present specification, information received from the walkie-talkie group may be referred to as second information. For example, the walkie-talkie control circuit may receive information related to walkie-talkie operation from an internal component of an electronic device, which is a host that provides walkie-talkie service. As a specific example, the internal component may be a battery or a power management integrated circuit (PMIC), and the information may include information or power mode information indicating a battery state of the electronic device. In addition, the internal component may be an RF communication module that supports RF communication, and the information may include information indicating that a signal for RF communication has been received. In the present specification, information received from an internal component of the electronic device may be referred to as third information.

In operation S310*a*, the walkie-talkie control circuit may generate setting information based on the information received in operation S300*a*. The setting information may correspond to information for setting a value of at least one parameter of each of a plurality of operations for processing the walkie-talkie data in the walkie-talkie processing circuit. The walkie-talkie control circuit may generate setting information by processing the received information so that the walkie-talkie processing circuit may set a value of at least one parameter of each of the plurality of operations based on the setting information.

Referring further to FIG. 6B, the setting information S_INFO generated by the walkie-talkie control circuit may include first type information INFO_1, second type information INFO_2, and third type information INFO_3.

In an implementation, the first type information INFO_1 may be generated based on the first information received through the user interface of the electronic device. The second type information INFO_2 may be generated based on the second information received from the walkie-talkie group. The third type information INFO_3 may be generated based on the third information received from an internal component of the electronic device.

In an implementation, operations for setting a parameter value by the first to third type information INFO_1, INFO_2, and INFO_3 may be the same or different. For example, the first type information INFO_1 may be used to set a value of at least one parameter of some parts of a plurality of operations, the second type information INFO_2 may be used to set a value of at least one parameter of some other parts of the plurality of operations, and the third type information INFO_3 may be used to set a value of at least one parameter of the remaining parts of the plurality of operations. In some implementations, the first to third type information INFO_1, INFO_2, and INFO_3 may be commonly used to determine the values of parameters of the plurality of operations after applying the same or different weights thereto.

However, in FIG. 6B, an implementation in which the first to third type information INFO_1, INFO_2, and INFO_3 are included in the setting information S_INFO has been illustrated, but the setting information S_INFO may include more pieces of type information based on information received through more paths.

Figure 7A:
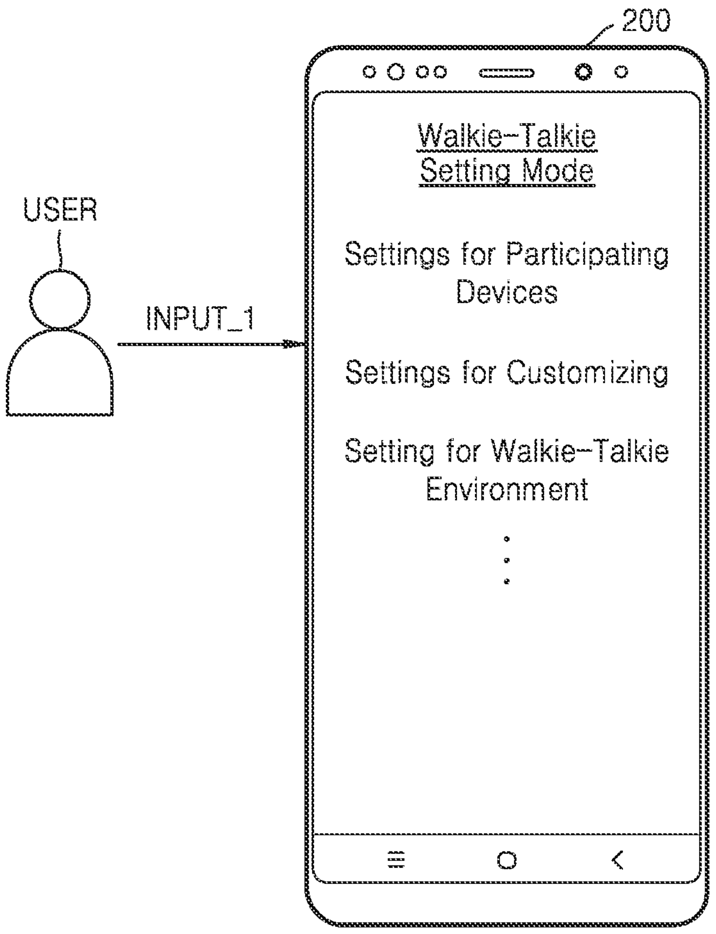
FIGS. 7A to 7C are diagrams illustrating an example method of generating first to third type information of FIG. 6B.
Figure 7B:
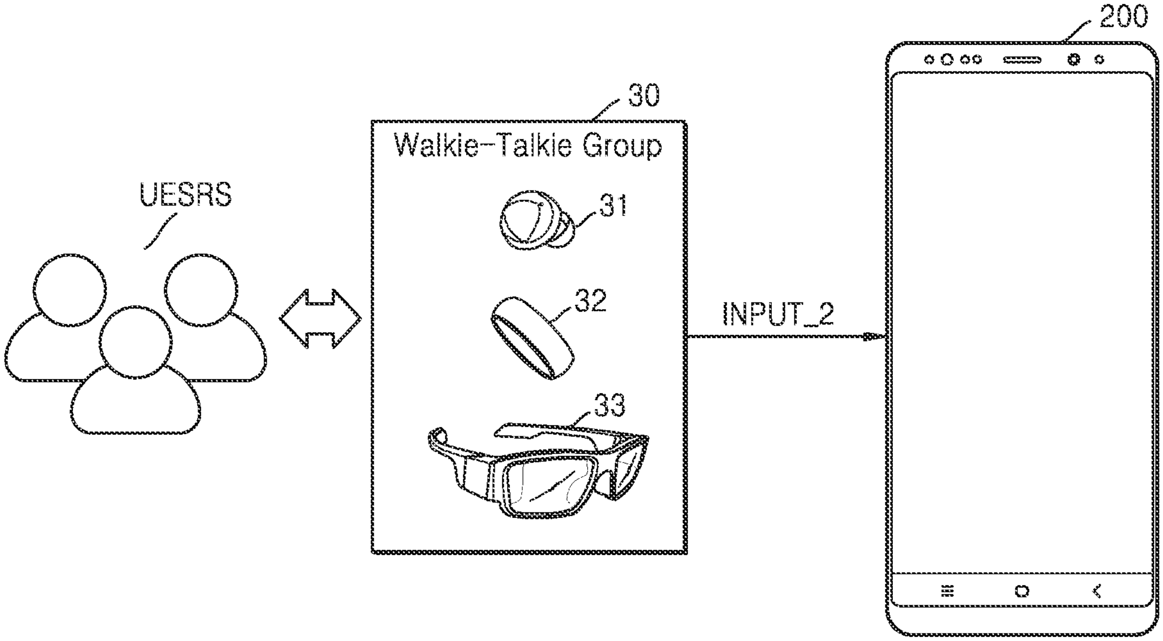
Figure 7C:
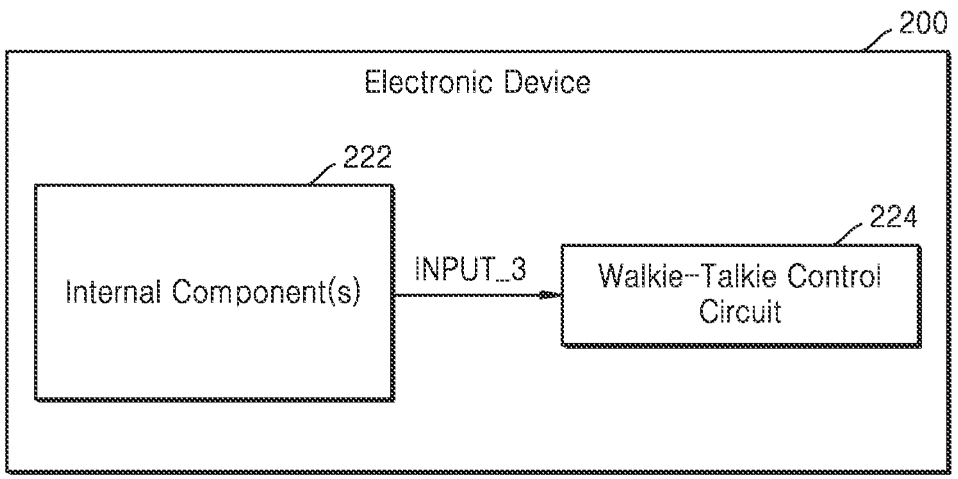

FIGS. 7A to 7C are diagrams for explaining an example method of generating first to third type information INFO_1, INFO_2, and INFO_3 of FIG. 6B.

Referring to FIG. 7A, when an application for a walkie-talkie service is executed on an electronic device 200, an image of a walkie-talkie setting mode may be output to a user USER through a display device of the electronic device 200. The user USER may input, through a user interface of the electronic device 200, Bluetooth devices participating in a walkie-talkie operation in a “Setting for Participating Devices” item, input requests desired by the user USER in a “Setting for Customizing” item, and input an environment in which the user USER receives a walkie-talkie service in a “Setting for Walkie-Talkie Environment” item.

As a specific example, in the "Setting for Participating Devices" item, Bluetooth devices participating in the walkie-talkie operation may be selected from among the plurality of Bluetooth devices connected to the electronic device 200. In the "Setting for Customizing" item, requests desired by the user USER may be entered, such as mute or voice modulation for a specific target, and the volume of each Bluetooth device participating in the walkie-talkie operation. In the "Setting for Walkie-Talkie Environment" item, a plurality of users, including a current user USER, may choose whether the environment in which the users receive the walkie-talkie service is a bicycle riding environment, an environment of exercising together, a conversation environment in a situation where seats are located at a distance from each other on a plane, a conversation environment for the hearing impaired, or a surrounding noisy environment.

In addition, when the electronic device 200 provides the walkie-talkie service to a plurality of users, there may be more items to receive various types of information related to the walkie-talkie service from the users USER.

In other words, the users USER may provide a first input INPUT_1 to the electronic device 200 through the user interface based on various items presented through the display device of the electronic device 200 to directly set up the walkie-talkie service in the "Walkie-Talkie Setting Mode".

The walkie-talkie control circuit of the electronic device 200 may generate the first type information INFO_1 (see FIG. 6B) based on the first input INPUT_1.

Referring further to FIG. 7B, a walkie-talkie group 30 includes Bluetooth devices such as earphones 31, smart rings 32, and smart glasses 33, and the earphones 31, the smart rings 32, and the smart glasses 33 may be worn on users USERS, respectively.

The earphones 31, the smart ring 32, and the smart glasses 33 may provide biometric information about users wearing the corresponding Bluetooth devices or location information of the corresponding Bluetooth devices to the electronic device 200 as a second input INPUT_2.

For example, the biometric information of users USERS may be used to provide a notification signal to other users when the volume of the earphone 31, the smart ring 32, and the smart glasses 33 worn by each user USER is adjusted according to the physical age, health state, etc. of the user, or an accident or a health problem that occurs to a specific user during receiving of the walkie-talkie service. In addition, biometric information of users USERS may be used in various ways to provide effective walkie-talkie services to users USERS.

For example, the location information of the Bluetooth devices, the earphone 31, the smart ring 32, and the smart glasses 33, may be used to check the locations of users USERS using the walkie-talkie service, or to provide a notification signal to a specific Bluetooth device so that a specific Bluetooth device does not deviate from the walkie-talkie serviceable distance. In addition, the biometric information of the Bluetooth devices, the earphone 31, the smart ring 32, and the smart glasses 33, may be used in various ways to provide an effective walkie-talkie service to users USERS.

The walkie-talkie control circuit of the electronic device 200 may generate the second type information INFO_2 (see FIG. 6B) based on the second input INPUT_2.

Referring further to FIG. 7C, the electronic device 200 may include an internal component(s) 222 and a walkie-talkie control circuit 224.

In an implementation, the internal component(s) 222 is (are) related to the walkie-talkie operation of the electronic device 200 and may provide a third input INPUT_3 to the walkie-talkie control circuit 224.

For example, the internal component(s) 222 may be a battery, a PMIC, an RF communication module, or the like. As a specific example, when the internal component(s) 222 is (are) a battery (batteries) or a PMIC(s), at least one of the information on the power state of the electronic device 200 and the information on the power mode of the electronic device 200 may be provided to the walkie-talkie control circuit 224 as a third input INPUT_3. In addition, when the internal component(s) 222 is (are) an RF communication module(s), information indicating that a signal for RF communication has been received may be provided to the walkie-talkie control circuit 224 as a third input INPUT_3.

For example, information on the power state of the electronic device 200 or information on the power mode thereof may be used to determine processing performance for the walkie-talkie data. As a specific example, all of a plurality of operations for processing the walkie-talkie data may be performed on the basis of the information about the power state of the electronic device 200 or the information about the power mode thereof, or some of the operations may be selectively performed. In addition, the information about the power state of the electronic device 200 or the information about the power mode thereof may be used to generate a notification signal indicating that the power state of the current electronic device 200 is not good for a plurality of users using a walkie-talkie service.

For example, the information indicating that a signal for RF communications has been received may be used to generate a notification signal for holding a walkie-talkie operation to a user who is an owner of the electronic device 200 and guiding whether to perform RF communications.

The walkie-talkie control circuit of the electronic device 200 may generate third type information INFO_3 (FIG. 6B) based on the third input INPUT_3.

Figure 8:
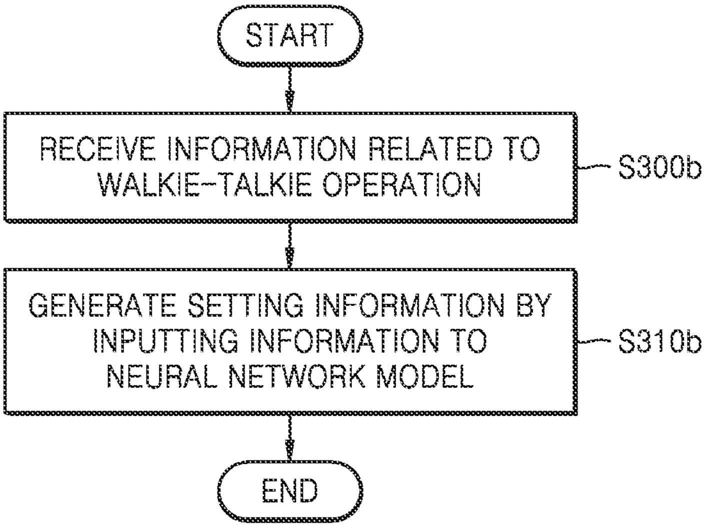
FIG. 8 is a flowchart illustrating an example method of generating setting information of a walkie-talkie control circuit.

FIG. 8 is a flowchart illustrating an example method of generating setting information of a walkie-talkie control circuit.

Referring to FIG. 8, in operation S300*b*, the walkie-talkie control circuit may receive information related to the walkie-talkie operation. As described above with reference to FIG. 6A, the walkie-talkie control circuit may receive information related to the walkie-talkie operation through a plurality of paths.

In operation S310*b*, the walkie-talkie control circuit may generate setting information by inputting the information received in operation S300*b* into a neural network model. In an implementation, the neural network model is managed by a walkie-talkie control circuit and may correspond to a result model of learning to generate optimal setting information.

Figure 9A:
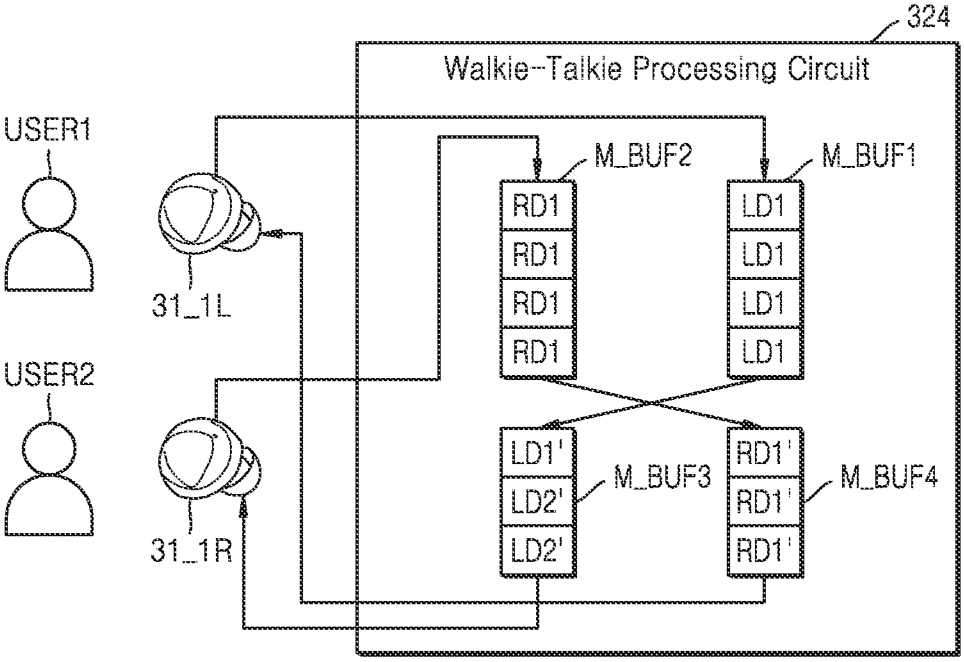
FIGS. 9A to 9C are diagrams for explaining an example method of operating a walkie-talkie processing circuit.
Figure 9B:
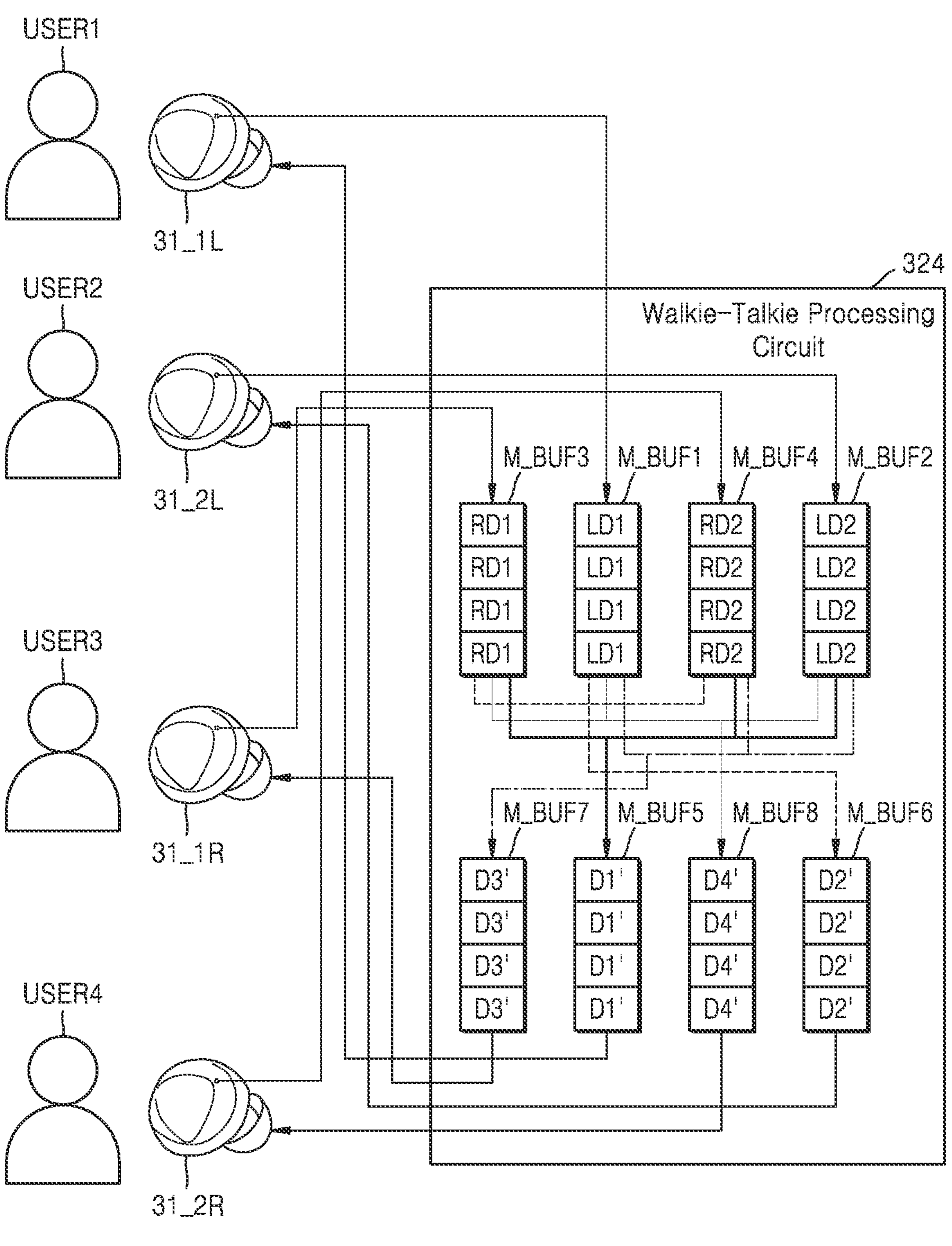
Figure 9C:
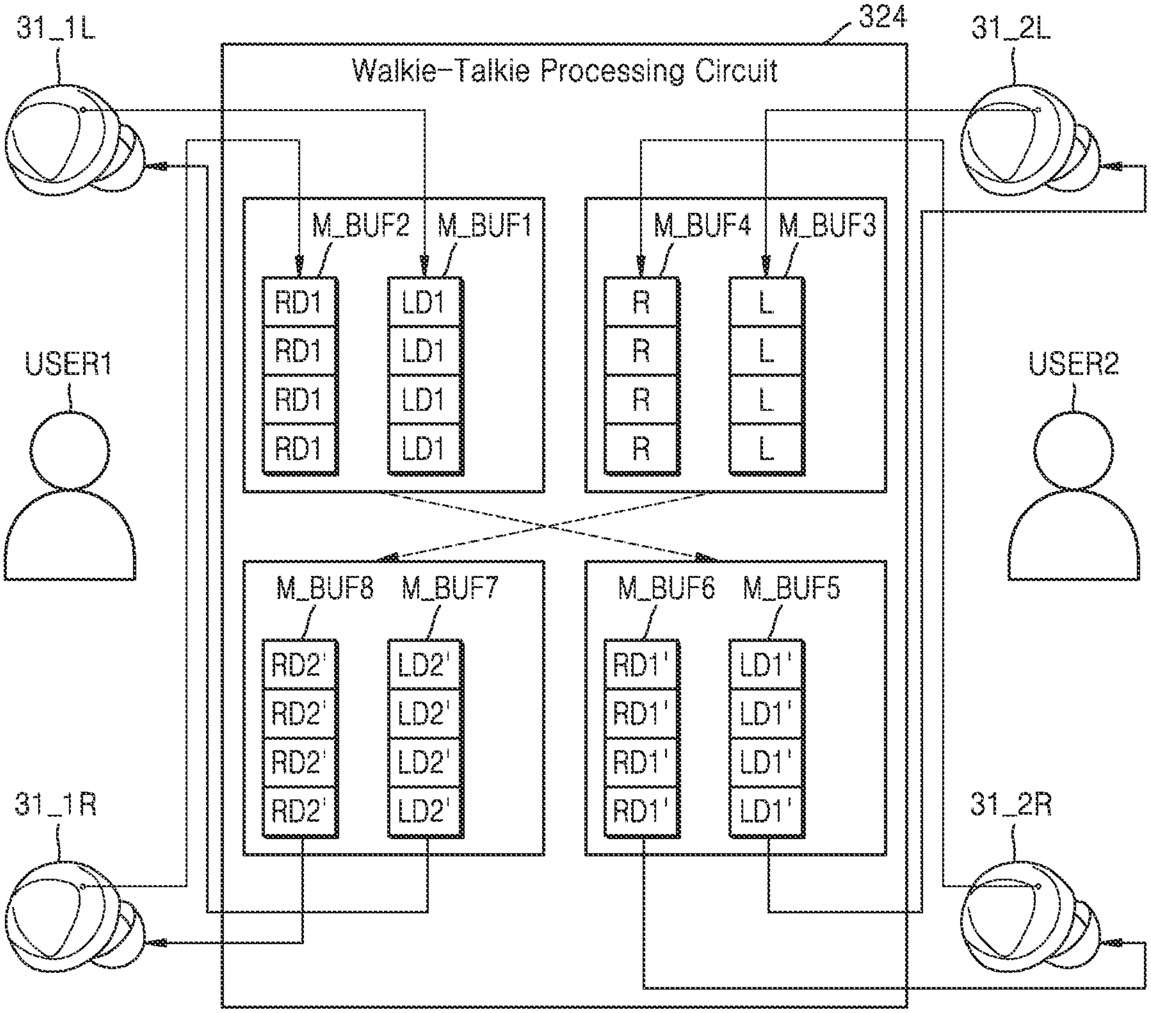

FIGS. 9A to 9C are diagrams for explaining an example method of operating a walkie-talkie processing circuit. FIGS. 9A to 9C illustrate an implementation of the walkie-talkie operation using earphones, but this is only an illustrative implementation, and it will be fully understood that the concept is not limited thereto. In addition, in FIGS. 9A to 9C, earphones and walkie-talkie processing circuits are shown to directly transmit and receive data, but this is for convenience of description, and the concept is not limited thereto.

Referring to FIG. 9A, a first user USER1 may wear a first left earphone 31_1L, and a second user USER2 may wear a first right earphone 31_1R to use a walkie-talkie service. The walkie-talkie processing circuit 324 may include first to fourth buffer memories M_BUF1 to M_BUF4. The first left earphone 31_1L and the first right earphone 31_1R may be paired with each other.

In an implementation, the walkie-talkie processing circuit 324 may buffer, in the first buffer memory M_BUF1, the first left data LD1 including voice information collected from the first user USER1 through the microphone configuration of the first left earphone 31_1L. The walkie-talkie processing circuit 324 may buffer, in the second buffer memory M_BUF2, the first right data RD1 including voice information collected from the second user USER2 through the microphone configuration of the first right earphone 31_1R. Afterwards, the walkie-talkie processing circuit 324 may process the first left data LD1 and the first right data RD1 through a plurality of operations, buffer the processed first left data LD1', in the third buffer memory M_BUF3, and buffer the processed first right data RD1' in the fourth buffer memory M_BUF4. The walkie-talkie processing circuit 324 may transmit the processed first left data LD1' of the third buffer memory M_BUF3 to the first right earphone 31_1R, and the processed first right data RD1' of the fourth buffer memory M_BUF4 to the first left earphone 31_1L. The processed first left data LD1' may be output to the ear of the second user USER2 through the speaker configuration of the first right earphone 31_1R, and the processed first right data RD1' may be output to the ear of the first user USER1 through the speaker configuration of the first left earphone 31_1L.

Referring further to FIG. 9B, the first user USER1 may wear the first left earphone 31_1L, the second user USER2 may wear the second left earphone 31_2L, the third user USER3 may wear the first right earphone 31_1R, and the fourth user USER4 may wear the second right earphone 31-2R, in order to use the walkie-talkie service. The walkie-talkie processing circuit 324 may include first to eighth buffer memories M_BUF1 to M_BUF8. The first left earphone 31_1L and the first right earphone 31_1R may be paired with each other, and the second left earphone 31_2L and the second right earphone 31_2R may be paired with each other.

The walkie-talkie processing circuit 324 may process data LD1, LD2, RD1, and RD2 received from the earphones 31_1L, 31_2L, 31_1R, and 31_2R through a plurality of operations using the first to eighth buffer memories M_BUF1 to M_BUF8, and then transmit the processed data D1', D2', D3' and D4' to the earphones 31_1L, 31_2L, 31_1R, and 31_2R.

Specifically, the walkie-talkie processing circuit 324 may buffer, in the first buffer memory M_BUF1, the first left data LD1 including voice information collected from the first user USER1 through the microphone configuration of the first left earphone 31_1L and may buffer, in the second buffer memory M_BUF2, the second left data LD2 including voice information collected from the second user USER2 through the microphone configuration of the second left earphone 31_2L. The walkie-talkie processing circuit 324 may buffer, in the third buffer memory M_BUF3, the first right data RD1 including voice information collected from the third user USER3 through the microphone configuration of the first right earphone 31_1R and may buffer, in the fourth buffer memory M_BUF4, the second right data RD2 including voice information collected from the fourth user USER4 through the microphone configuration of the second right earphone 31_2R.

The walkie-talkie processing circuit 324 may process the first right data RD1, the second right data RD2, and the second left data LD2 through the plurality of operations to generate the first data D1', buffer, in the fifth buffer memory M_BUF5, the generated first data D1', and then transmit the first data D1' of the fifth buffer memory M_BUF5 to the first left earphone 31_1L. The walkie-talkie processing circuit 324 may process the first left data LD1, the first right data RD1, and the second right data RD2 through the plurality of operations to generate the second data D2', buffer, in the sixth buffer memory M_BUF6, the generated second data D2', and then transmit the second data D2' of the sixth buffer memory M_BUF6 to the second left earphone 31_2L. The walkie-talkie processing circuit 324 may process the first left data LD1, the second left data LD2, and the second right data RD2 through the plurality of operations to generate the third data D3', buffer, in the seventh buffer memory M_BUF7, the generated third data D3', and then transmit the third data D3' of the seventh buffer memory M_BUF7 to the first right earphone 31_1R. In addition, the walkie-talkie processing circuit 324 may process the first left data LD1, the second left data LD2, and the first right data RD1 through the plurality of operations to generate the fourth data D4', buffer, in the eighth buffer memory M_BUF8, the generated fourth data D4', and transmit the fourth data D4' of the eighth buffer memory M_BUF8 to the second right earphone 31_2R.

Referring further to FIG. 9C, the first user USER1 may wear the first left earphone 31_1L and the first right earphone 31_1R, paired with each other, and the second user USER2 may wear the second left earphone 31_2L and the second right earphone 31_2R, paired with each other, in order to use the walkie-talkie service. The walkie-talkie processing circuit 324 may include first to eighth buffer memories M_BUF1 to M_BUF8.

The walkie-talkie processing circuit 324 may buffer, in the first buffer memory M_BUF1, the first left data LD1 including voice information collected from the first user USER1 through the microphone configuration of the first left earphone 31_1L and may buffer, in the second buffer memory M_BUF2, the first right data RD1 including voice information collected from the first user USER1 through the microphone configuration of the first right earphone 31_1R. The walkie-talkie processing circuit 324 may buffer, in the third buffer memory M_BUF3, the second left data LD2 including voice information collected from the second user USER2 through the microphone configuration of the second left earphone 31_2L and may buffer, in the fourth buffer memory M_BUF4, the second right data RD2 including voice information collected from the second user USER2 through the microphone configuration of the second right earphone 31_2R.

The walkie-talkie processing circuit 324 may process the first left data LD1 through the plurality of operations to buffer the processed first left data LD1' in the fifth buffer memory M_BUF5, and transmit the processed first left data LD1' of the fifth buffer memory M_BUF5 to the second left earphone 31_2L. The walkie-talkie processing circuit 324 may process the first right data RD1 through the plurality of operations to buffer the processed first right data RD1' in the sixth buffer memory M_BUF6, and transmit the processed first right data RD1' of the sixth buffer memory M_BUF6 to the second right earphone 31_2R. The walkie-talkie processing circuit 324 may process the second left data LD2 through the plurality of operations to buffer the processed second left data LD2' in the seventh buffer memory M_BUF7, and transmit the processed second left data LD1' of the seventh buffer memory M_BUF7 to the first left earphone 31_1L. The walkie-talkie processing circuit 324 may process the second right data RD2 through the plurality of operations to buffer the processed second right data RD2' in the eighth buffer memory M_BUF8, and transmit the processed second right data RD2' of the eighth buffer memory M_BUF8 to the first right earphone 31_1R.

As shown in FIGS. 9A to 9B, the walkie-talkie processing circuit 324 may perform the walkie-talkie operation adaptively using the plurality of buffer memories depending on the number of Bluetooth devices participating in the walkie-talkie operation.

Figure 10A:
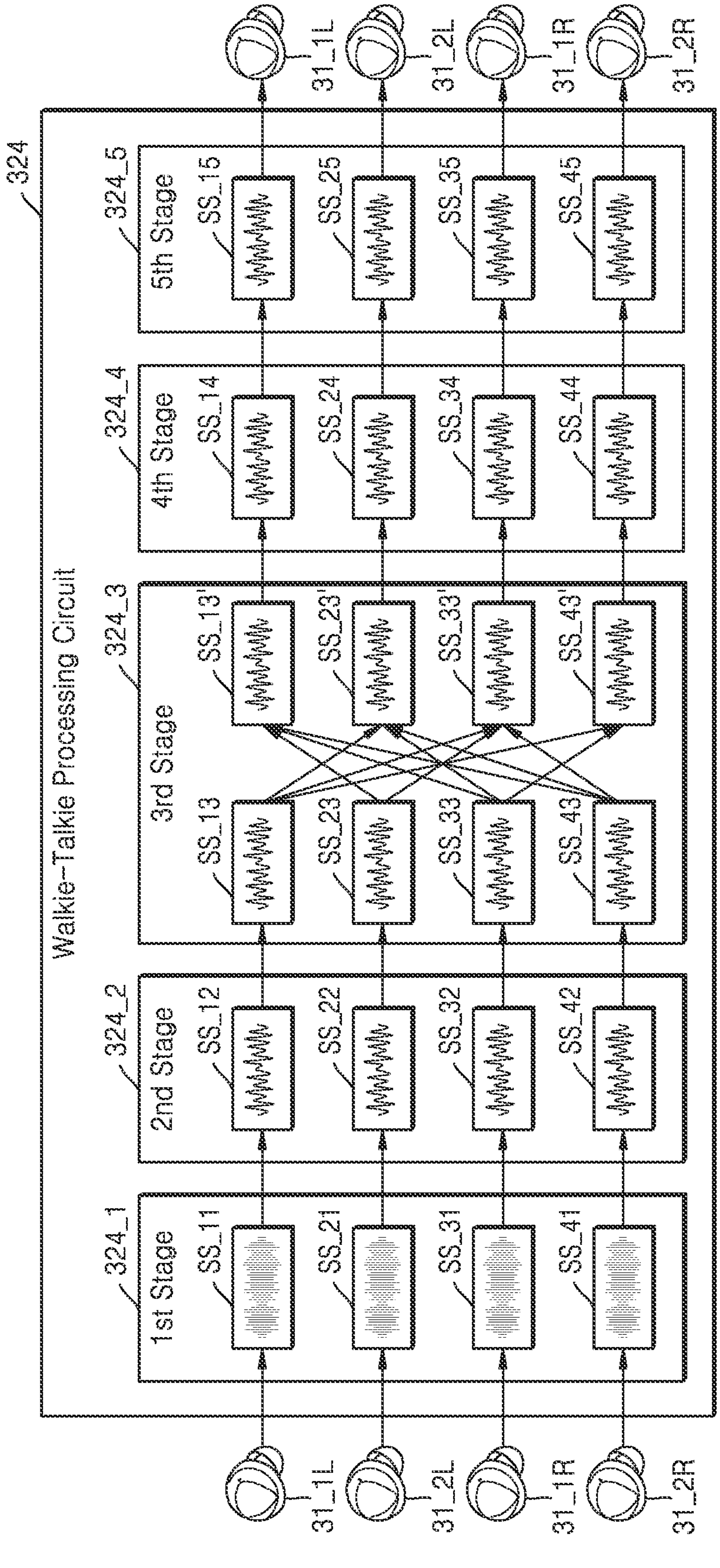
FIGS. 10A to 10B are block diagrams for explaining an example method of operating a walkie-talkie processing circuit.
Figure 10B:
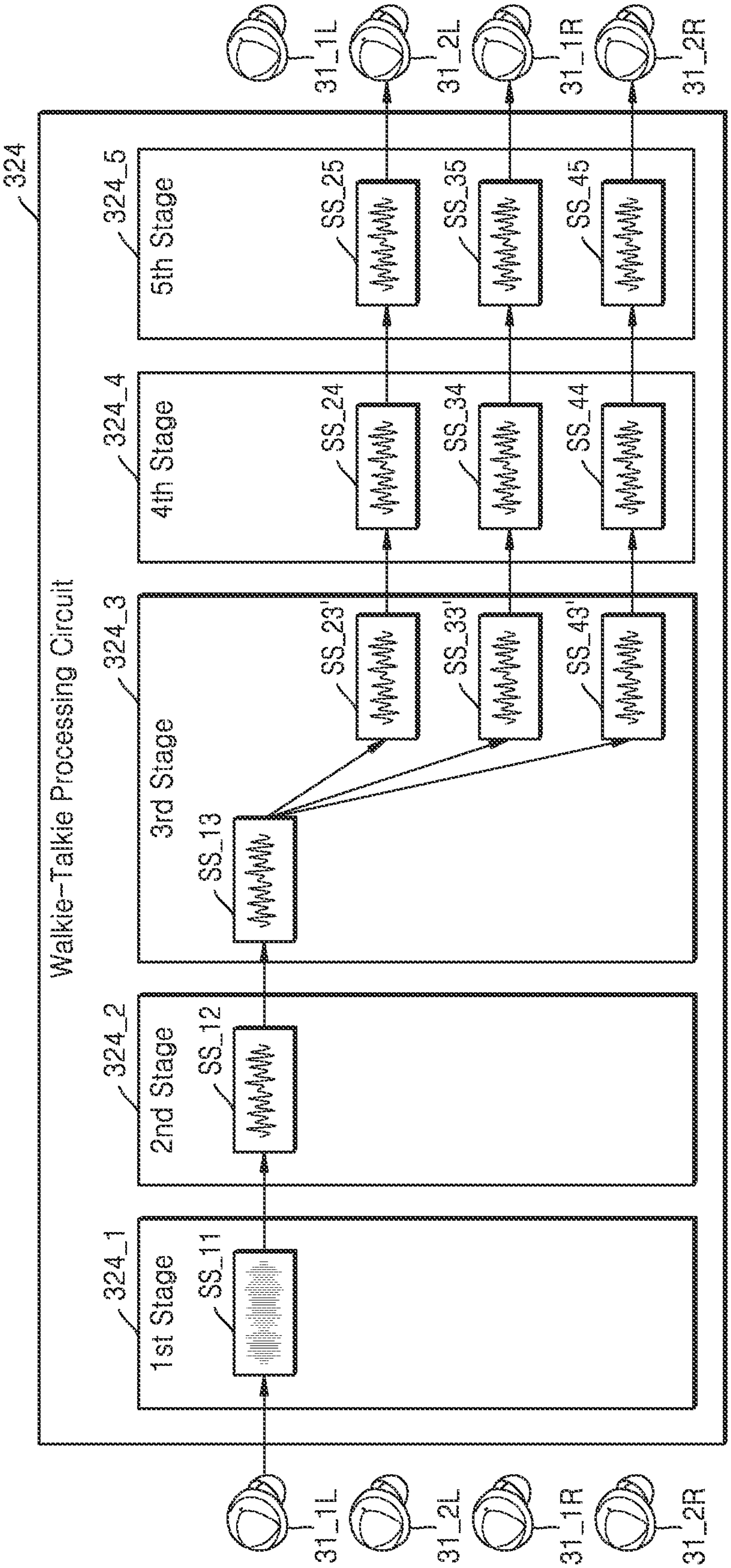

FIGS. 10A to 10B are block diagrams for explaining an example method of operating a walkie-talkie processing circuit.

Referring to FIG. 10A, the walkie-talkie processing circuit 324 may include first to fifth stages 324_1 to 324_5. In the present specification, the stages 324_1 to 324_5 may be defined as software logic or hardware logic capable of performing a processing operation according to an operation assigned to each stage.

In an implementation, a first operation may be assigned to the first stage 324_1 to decompress the first walkie-talkie data received from the first to fourth Bluetooth devices 31_1L, 31_2L, 31_1R, and 31_2R. For example, the compression method of the first walkie-talkie data may correspond to any one of a plurality of compression methods defined by the Bluetooth protocol, and the decompression method may coincide with the compression method. The first stage 324_1 may buffer, in predetermined buffer memories, $1^{st}$-1 to $4^{th}$-1 signals SS_11, SS_21, SS_31, and SS41 generated through the decompression operation. Meanwhile, the value of at least one first parameter in the first operation allocated to the first stage 324_1 may be set in advance according to the above-described setting information, and at least one first parameter may relate to a decompression method.

In an implementation, a second operation is allocated to the second stage 324_2 to perform a noise cancellation operation on the $1^{st}$-1 to $4^{th}$-1 signals SS_11, SS_21, SS_31, and SS41. For example, the noise cancellation method for each of the $1^{st}$-1 to $4^{th}$-1 signals SS_11, SS_21, SS_31, and SS41 may be the same or different. The second stage 324_2 may buffer, in predetermined buffer memories, the $1^{st}$-2 to $4^{th}$-2 signals SS_12, SS_22, SS_32, and SS_42 generated through the noise cancellation operation. Meanwhile, the value of at least one second parameter in the second operation allocated to the second stage 324_2 may be set in advance according to the above-described setting information, and at least one second parameter may relate to a noise cancellation method.

In an implementation, a third operation is assigned to the third stage 324_3 to perform a routing operation for the $1^{st}$-3 to $4^{th}$-3 signals SS_13, SS_23, SS_33, and SS_43 received from the second stage 324_2. That is, the third stage 324_3 may perform routing such that the $1^{st}$-3 to $4^{th}$-3 signals SS_13, SS_23, SS_33, and SS_43, are properly transmitted to the first to fourth Bluetooth devices 31_1L, 31_2L, 31_1R and 31_2R considering the speaker and listener in the walkie-talkie operation. The third stage 324_3 may buffer, in in predetermined buffer memories, the $1^{st}$-3' to $4^{th}$-3' signals SS_13', SS_23', SS_33', and SS_43' routed through a routing operation. Meanwhile, the value of at least one third parameter in the third operation allocated to the third stage 324_3 may be preset according to the above-described setting information, and at least one third parameter may relate to data routing.

In an implementation, a fourth operation is assigned to the fourth stage 324_4, and a size adjustment operation may be performed on the $1^{st}$-3' to $4^{th}$-3' signals SS_13', SS_23', SS_33', and SS_43'. For example, the degree of size adjustment for each of the $1^{st}$-3' to $4^{th}$-3' signals SS_13', SS_23', SS_33', and SS43' may be different. The second stage 324_2 may buffer, in predetermined buffer memories, the $1^{st}$-4 to $4^{th}$-4 signals SS_14, SS_24, SS_34, and SS_44 generated through the size adjustment operation. Meanwhile, the value of at least one fourth parameter in the fourth operation allocated to the fourth stage 324_4 may be set in advance according to the above-described setting information, and at least one fourth parameter may relate to the size adjustment degree.

In an implementation, a fifth operation is assigned to the fifth stage 324_5, and the $1^{st}$-4 to $4^{th}$-4 signals SS_14, SS_24, SS_34, SS_44 may be compressed to generate $1^{st}$-5 to $4^{th}$-5 signals SS_15, SS_25, SS_35, SS_45, and buffer the generated $1^{st}$-5 to $4^{th}$-5 signals SS_15, SS_25, SS_35, SS_45 in predetermined buffer memories. The fifth stage 324_5 may transmit the $1^{st}$-5 to $4^{th}$-5 signals SS_15, SS_25, SS_35, and SS_45 to the first to fourth Bluetooth devices 31_1L, 31_2L, 31_1R, and 31_2R as second walkie-talkie data. Meanwhile, the value of at least one fifth parameter in the fifth operation allocated to the fifth stage 324_5 may be set in advance according to the above-described setting information, and at least one fifth parameter may relate to a compression method.

However, in FIG. 10A, an implementation in which the walkie-talkie processing circuit 324 performs processing operations on walkie-talkie data through five operations including five stages, the stages 324_1 to 324_5, is illustrated, but this is only an implementation, and the implementations are not limited thereto. The walkie-talkie processing circuit 324 may include more stages and may perform a processing operation on the walkie-talkie data through the more operations.

Referring further to FIG. 10B, when the first user wearing the first Bluetooth device 31_1L is a speaker and the second to fourth users wearing the second to fourth Bluetooth devices 31_2L, 31_1R, and 31_2R are listeners, the first stage 324_1 may generate the $1^{st}$-1 signal SS_11, by performing a decompression operation on the first walkie-talkie data received from the first Bluetooth device 31_1L. The decompression operation of the first stage 324_1 may be based on a value of at least one first parameter of the first operation.

The second stage 324_2 may generate a $1^{st}$-2 signal SS_12 by performing a noise cancellation operation on a $1^{st}$-1 signal SS_11. The noise cancellation operation of the second stage 324_2 may be based on a value of at least one second parameter of the second operation.

The third stage 324_3 may route the $1^{st}$-3 signal SS_13 received from the second stage 324_2 to generate $2^{nd}$-3' to $4^{th}$-3' signals SS_23', SS_33', and SS43'. The routing operation of the third stage 324_3 may be based on a value of at least one third parameter of the third operation.

The fourth stage 324_4 may perform a size adjustment operation on the $2^{nd}$-3' to $4^{th}$-3' signals SS_23', SS_23', and SS43'. As a specific example, the fourth stage 324_4 may generate the $2^{nd}$-4 signal SS_24 by adjusting the size of the $2^{nd}$-3' signal SS_23' to be small, generate the $3^{rd}$-4 signal SS_34 by equally maintaining the size of the $3^{rd}$-3' signal SS_33', and generate the $4^{th}$-4 signal SS_44 by adjusting the size of the $4^{th}$-3' signal SS_43' to be great. The size adjustment operation of the fourth stage 324_4 may be based on a value of at least one fourth parameter of the fourth operation. For example, a signal provided to a Bluetooth device worn by a user in a noisy environment, a user who wants to hear a loud voice, or a user with weak hearing may be greatly adjusted. As another example, signals provided to Bluetooth devices worn by users in low ambient noise environments, users who want to hear small voices, or users with good hearing may be adjusted to be less or maintained in size.

The fifth stage 324_5 may perform a compression operation on the $2^{nd}$-4 to $4^{th}$-4 signals SS_24, SS_34, and SS_44 to generate the $2^{nd}$-5 to $4^{th}$-5 signals SS_25, SS_35, and SS_45 and may transmit the generated $2^{nd}$-5 to $4^{th}$-5 signals SS_25, SS_35, and SS_45 to the second to fourth Bluetooth devices 31_2L, 31_1 and 31_2R as second walkie-talkie data. The compression operation of the fifth stage 324_5 may be based on a value of at least one fifth parameter of the fifth operation.

Figure 11A:
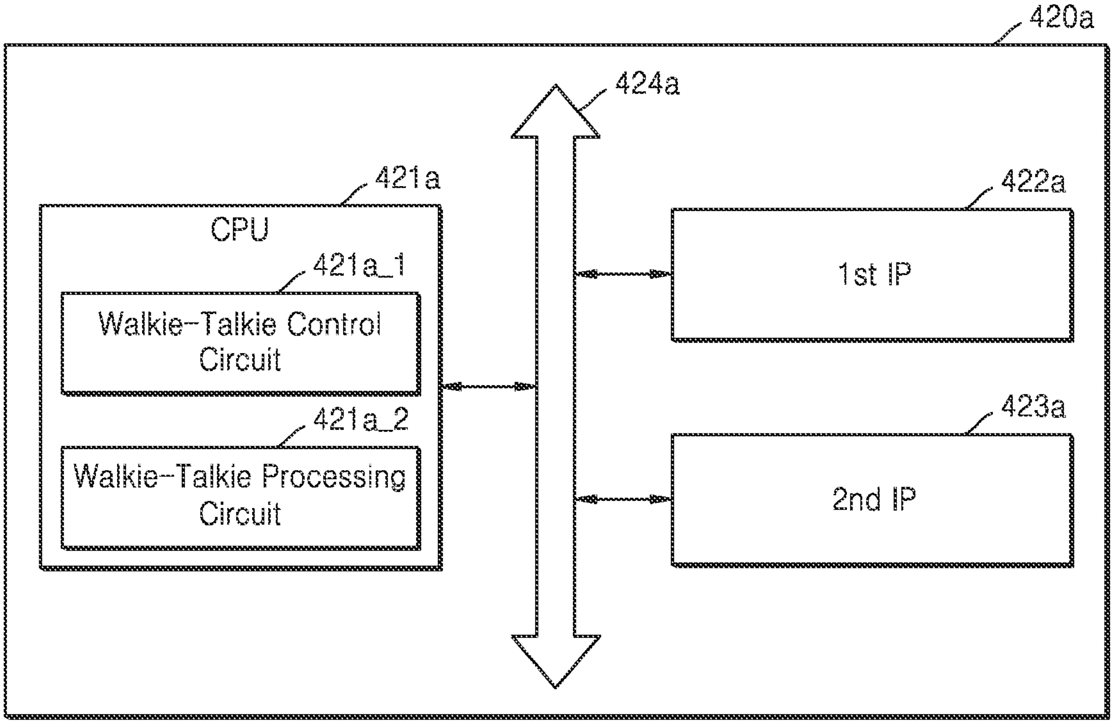
FIGS. 11A and 11B are block diagrams schematically illustrating an example processor.
Figure 11B:
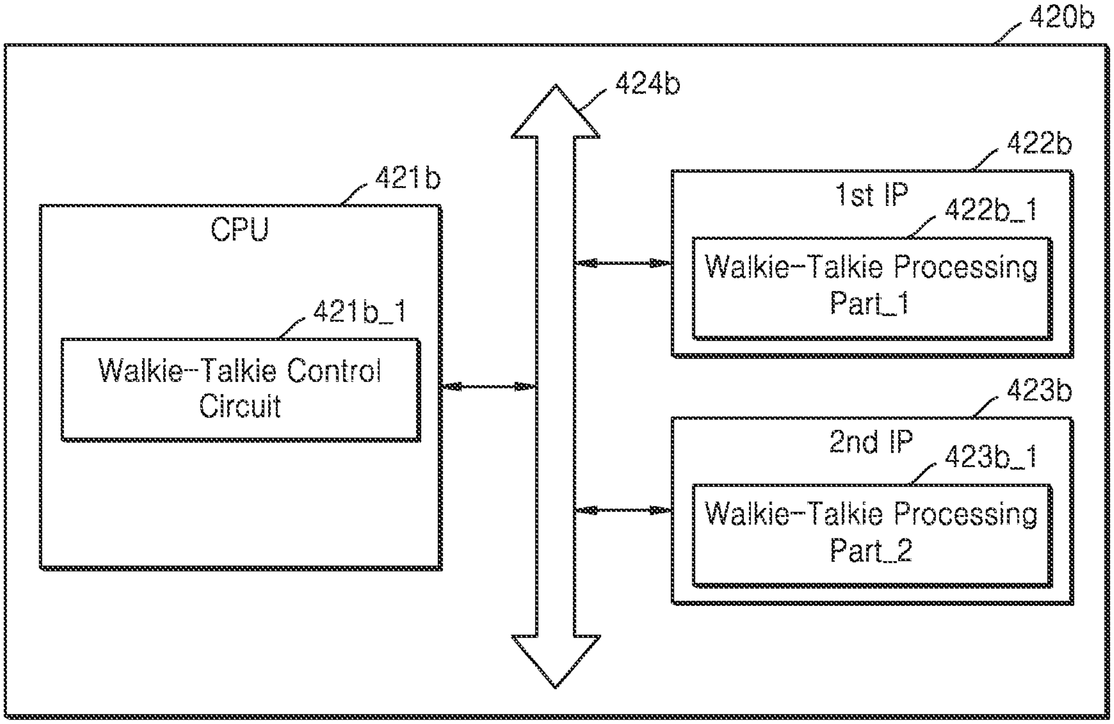

FIGS. 11A and 11B are block diagrams schematically illustrating an example processor.

Referring to FIG. 11A, a processor 420*a* may include a CPU 421*a*, a first IP 422*a*, a second IP 423*a*, and a bus 424*a*. In this case, the processor 420*a* may be implemented as a mobile AP.

In an implementation, the CPU 421*a* may include a walkie-talkie control circuit 421*a*_1 and a walkie-talkie processing circuit 421*a*_2. For example, the walkie-talkie control circuit 421*a*_1 and the walkie-talkie processing circuit 421*a*_2 may be implemented in software, hardware, or a software/hardware combination within the CPU 421*a*.

Referring further to FIG. 11B, compared to FIG. 11A, the walkie-talkie processing circuit may include a first walkie-talkie processing part 422*b*_1 and a second walkie-talkie processing part 423*b*_1 and the first walkie-talkie processing part 422*b*_1 is implemented as hardware in the first IP 422*b*, and the second walkie-talkie processing part 23*b*2 is implemented as hardware in the second IP 423*b*. The first IP 422*b* and the second IP 423*b* may be circuits configured to assist the operation of the CPU 421*a* or to perform independent operations on behalf of the CPU 421*a*.

For example, the first IP 422*b* may be a DSP and the second IP 423*b* may be an NPU. In addition, the first walkie-talkie processing part 422*b*_1 may include the first, third, and fifth stages 324_1, 324_3, and 324_5 of FIG. 10A, and the second walkie-talkie processing part 423*b*_1 may include the second and fourth stages 324_2 and 324_4 of FIG. 10A. In this case, the first walkie-talkie processing part 422*b*_1 and the second walkie-talkie processing part 423*b*_1 may alternately operate, and operation result data may be transmitted and received through the bus 424*b*.

However, the implementations of the processors 420*a* and 420*b* illustrated in FIGS. 11A and 11B are only illustrative, and the implementations are not limited thereto, and the processors 420*a* and 420*b* may be implemented in various ways to effectively perform the walkie-talkie operation according to the concept.

Figure 12:
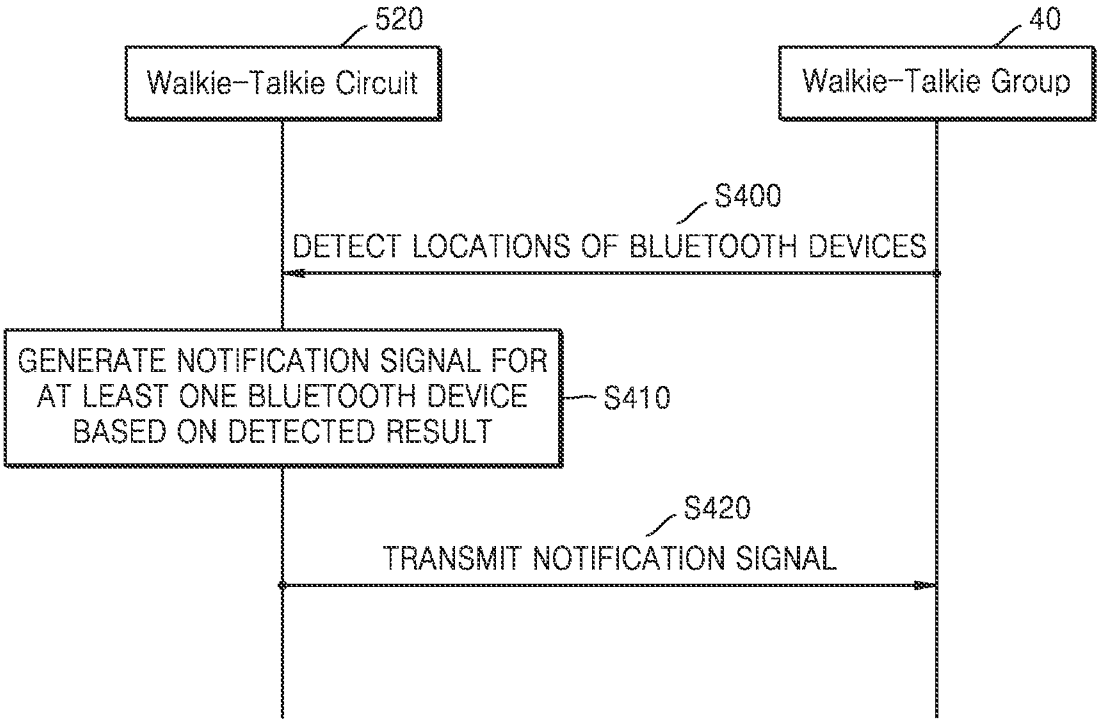
FIG. 12 is a flowchart illustrating an example method of operating a walkie-talkie circuit.

FIG. 12 is a flowchart illustrating an example method of operating a walkie-talkie circuit.

Referring to FIG. 12, in operation S400, the walkie-talkie circuit 520 may detect locations of Bluetooth devices included in the walkie-talkie group 40. For example, the walkie-talkie circuit 520 may actively detect the locations of the Bluetooth devices included in the walkie-talkie group 40 or may receive location information from the Bluetooth devices as described with reference to FIG. 6A and recognize the locations of the Bluetooth devices based on this.

In operation S410, the walkie-talkie circuit 520 may generate a notification signal for at least one of the Bluetooth devices based on the detection result of operation S400. For example, the walkie-talkie circuit 520 may generate a notification signal not to leave the available area of the walkie-talkie service for a Bluetooth device that is separated by a critical distance according to the coverage of Bluetooth communication.

In operation S420, the walkie-talkie circuit 520 may transmit the notification signal generated in operation S410 to at least one of the Bluetooth devices included in the walkie-talkie group 40.

Figure 13:
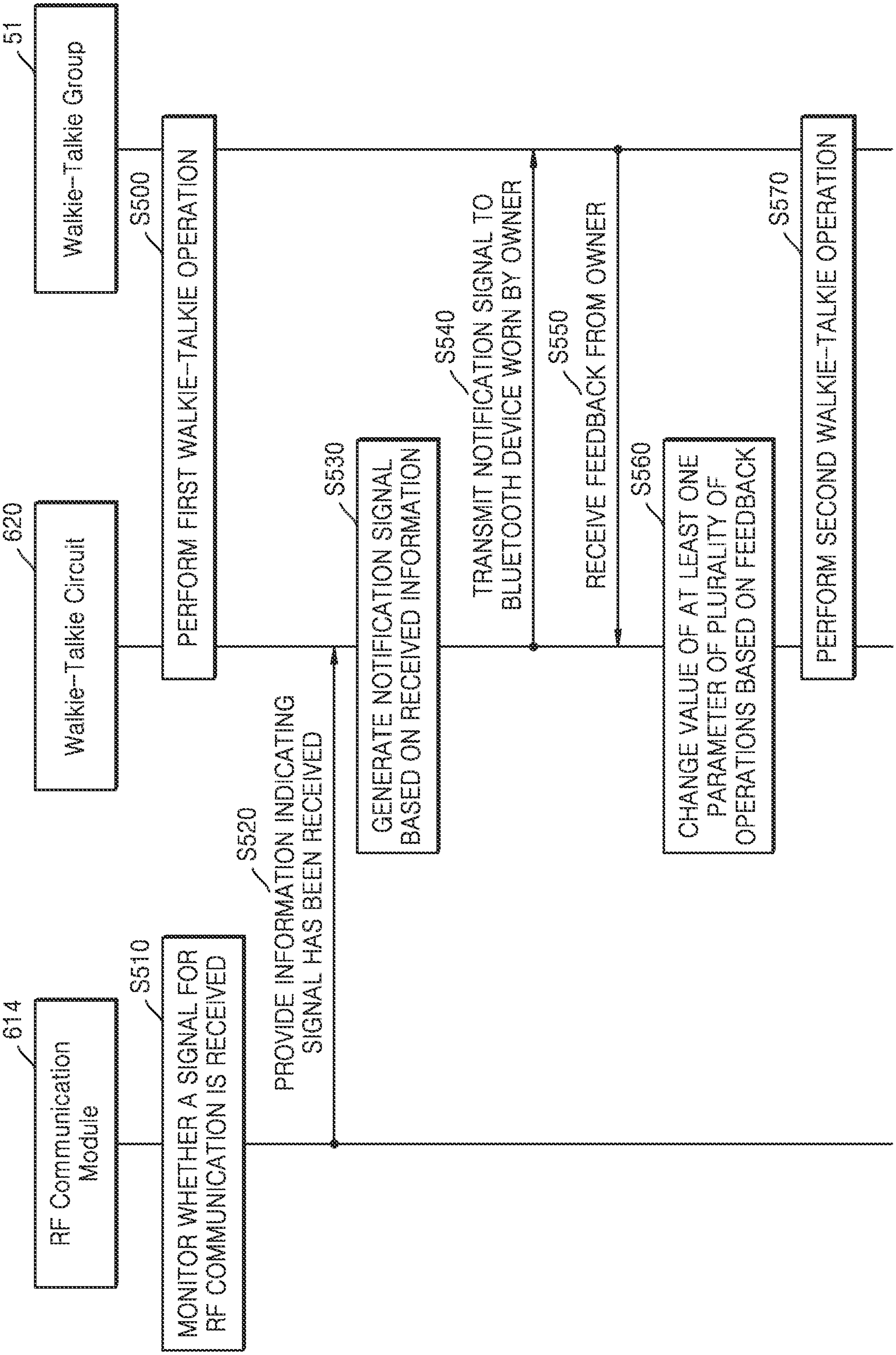
FIG. 13 is a flowchart illustrating another example method of operating a walkie-talkie circuit.

FIG. 13 is a flowchart illustrating another example method of operating a walkie-talkie circuit.

Referring to FIG. 13, in operation S510, the RF communication module 614 in an electronic device may monitor whether a signal for RF communication is received. For example, the RF communication module 614 may monitor whether a voice phone call is received by Voice over LTE (VOLTE).

In operation S500, a walkie-talkie circuit 620 and a walkie-talkie group 51 may perform a first walkie-talkie operation independently of operation S510.

In operation S520, the RF communication module 614 may provide, to the walkie-talkie circuit 620, information indicating that a signal for RF communication has been received.

In operation S530, the walkie-talkie circuit 620 may generate a notification signal based on the received information.

In operation S540, the walkie-talkie circuit 620 may transmit a notification signal to a Bluetooth device worn by an owner.

In operation S550, the walkie-talkie circuit 620 may receive feedback from the owner. For example, the owner may provide feedback indicating whether to perform RF communication through a worn Bluetooth device or electronic device, that is, whether to make a voice call.

In operation S560, the walkie-talkie circuit 620 may change a value of at least one parameter among a plurality of operations based on user feedback. For example, when the owner wants to perform RF communication, the walkie-talkie circuit 620 may mute to prevent voice by the walkie-talkie service from being delivered to the Bluetooth device worn by the owner or change the value of at least one parameter to prevent voice from being routed.

In operation S570, the walkie-talkie circuit 620 and the walkie-talkie group 51 may perform a second walkie-talkie operation to which a change in a value of at least one parameter is applied.

Figure 14:
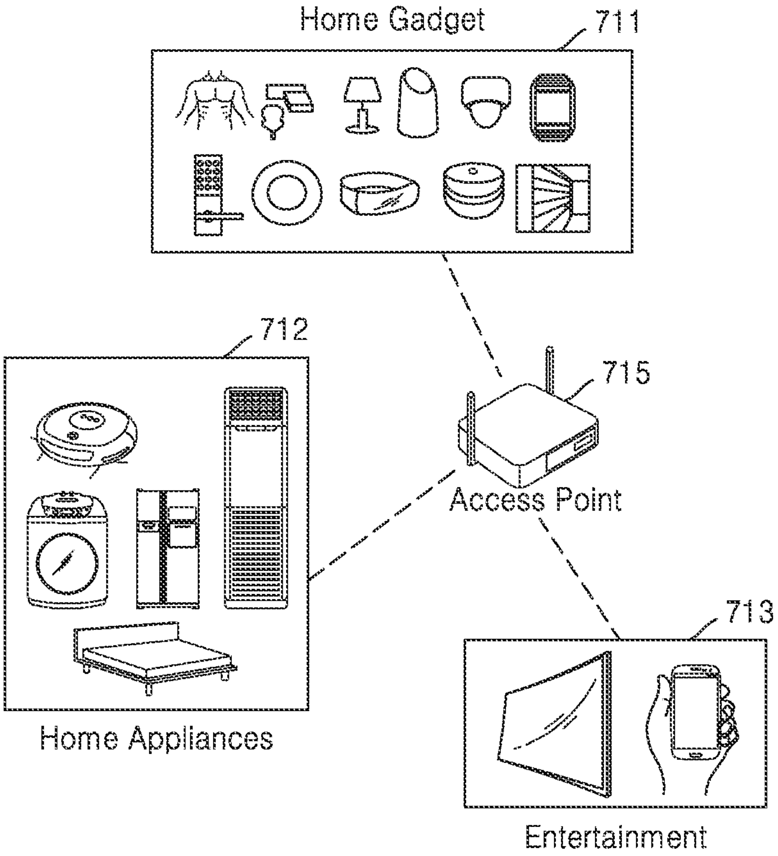
FIG. 14 is a diagram illustrating examples of an apparatus for wireless communication.

FIG. 14 is a diagram illustrating examples of an apparatus for wireless communication. Specifically, FIG. 14 shows an Internet of Things (IoT) network system including home gadgets 711, home appliances 712, entertainment devices 713, and an access point 715.

As described above with reference to FIGS. 1 to 13, the devices for wireless communication of FIG. 14 may include a device used as a host and the other devices used as devices for collecting or outputting voices for a walkie-talkie operation, in order to perform the walkie-talkie operation. At least one of the home gadgets 711, the home appliances 712, the entertainment devices 713, and the access points 715 may include a walkie-talkie circuit according to implementations.

While this specification contains many specific implementation details, these should not be construed as limitations on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

While the concepts described herein have been particularly shown and described with reference to implementations thereof, it will be understood that various changes in form and details may be made therein without departing from the spirit and scope of the following claims.

What is claimed is:

1. An electronic device comprising:

a communication chip including a Bluetooth circuit that is configured to perform Bluetooth communication; and a processor including a walkie-talkie circuit that is configured to, using the Bluetooth circuit, perform a walkie-talkie operation with a walkie-talkie group, the walkie-talkie group including a plurality of Bluetooth devices, wherein the walkie-talkie circuit comprises:

a walkie-talkie control circuit configured to generate setting information related to the walkie-talkie operation; and a walkie-talkie processing circuit configured to:

based on the setting information, set values of parameters of a plurality of operations for the walkie-talkie operation, and based on processing first walkie-talkie data received from the walkie-talkie group through the plurality of operations, generate second walkie-talkie data.

2. The electronic device of claim 1, wherein the plurality of operations comprise:

a first operation of removing noise with respect to the first walkie-talkie data;

a second operation of routing the first walkie-talkie data; and a third operation of adjusting a size of the first walkie-talkie data.

3. The electronic device of claim 1, wherein the setting information comprises at least one of first type information generated based on first information received through a user interface, second type information generated based on second information received from the walkie-talkie group, or third type information generated based on third information received from an internal component of the electronic device.

4. The electronic device of claim 3, wherein the first information comprises at least one of information of the plurality of Bluetooth devices participating in the walkie-talkie operation, information for customizing the walkie-talkie operation for each Bluetooth device of the plurality of Bluetooth devices, or information of an environment in which the walkie-talkie operation is performed.

5. The electronic device of claim 3, wherein the second information comprises at least one of biometric information or location information of users wearing the plurality of Bluetooth devices.

6. The electronic device of claim 3, wherein the third information comprises at least one of a power state of the electronic device or a power mode of the electronic device.

7. The electronic device of claim 1, wherein the walkie-talkie circuit is configured to generate the setting information by entering, into a neural network model, information collected from at least one of a user interface, the walkie-talkie group, or an internal component of the electronic device.

8. The electronic device of claim 1, wherein the plurality of Bluetooth devices comprise a first Bluetooth device and a second Bluetooth device that are paired with each other, and wherein the first Bluetooth device and the second Bluetooth device are configured to be respectively worn by a first user and a second user.

9. The electronic device of claim 8, wherein the plurality of Bluetooth devices further comprise a third Bluetooth device and a fourth Bluetooth device that are paired with each other, and wherein the third Bluetooth device and the fourth Bluetooth device are configured to be respectively worn by a third user and a fourth user.

10. The electronic device of claim 1, wherein the plurality of Bluetooth devices comprise a first Bluetooth device, a second Bluetooth device, a third Bluetooth device, and a fourth Bluetooth device, the first Bluetooth device and the second Bluetooth device paired with each other, and the third Bluetooth device and the fourth Bluetooth device paired with each other, wherein the first Bluetooth device and the second Bluetooth device are configured to be worn by a first user, and wherein the third Bluetooth device and the fourth Bluetooth device are configured to be worn by a second user.

11. The electronic device of claim 1, wherein the walkie-talkie circuit is configured to adaptively change the setting information while performing the walkie-talkie operation, and wherein the walkie-talkie processing circuit is configured to perform a processing operation for the walkie-talkie operation by changing a value of a parameter of an operation of the plurality of operations based on the changed setting information.

12. The electronic device of claim 1, wherein the processor comprises a first intellectual property (IP) and a second IP, wherein the walkie-talkie processing circuit comprises a first walkie-talkie processing sub-circuit configured to control some of the plurality of operations and a second walkie-talkie processing sub-circuit configured to control the rest of the plurality of operations, wherein the first IP comprises the first walkie-talkie processing sub-circuit, and wherein the second IP comprises the second walkie-talkie processing sub-circuit.

13. The electronic device of claim 12, wherein the first IP corresponds to a digital signal processor, and the second IP corresponds to a neural processing unit (NPU).

14. The electronic device of claim 12, wherein the first walkie-talkie processing sub-circuit and the second walkie-talkie processing sub-circuit are configured to operate alternately.

15. The electronic device of claim 1, wherein the walkie-talkie circuit is configured to detect locations of the plurality of Bluetooth devices to generate a detection result and is configured to, based on the detection result, generate a notification signal for at least one Bluetooth device of the plurality of Bluetooth devices, and wherein the notification signal is transmitted to the at least one Bluetooth device.

16. The electronic device of claim 1, wherein the communication chip further comprises a radio frequency (RF) communication circuit configured to support RF communication, wherein the walkie-talkie circuit is configured to generate a notification signal, the notification signal indicating that a signal for RF communication is received in the RF communication circuit, and wherein the notification signal is transmitted to a Bluetooth device of the plurality of Bluetooth devices, the Bluetooth device being worn by an owner of the electronic device.

17. The electronic device of claim 16, wherein the walkie-talkie processing circuit is configured to, based on feedback on the notification signal received from the Bluetooth device worn by the owner, change a value of at least one parameter of the plurality of operations to perform a processing operation for the walkie-talkie operation.

18. An operation method of an electronic device performing a walkie-talkie operation with a walkie-talkie group including a plurality of Bluetooth devices, the operation method comprising:

collecting a plurality of pieces of information related to the walkie-talkie operation;

generating setting information based on the plurality of pieces of information;

based on the setting information, setting values of parameters of a plurality of operations for the walkie-talkie operation;

based on processing first walkie-talkie data received from the walkie-talkie group through the plurality of operations, generating second walkie-talkie data; and transmitting the second walkie-talkie data to the walkie-talkie group.

19. The operation method of claim 18, wherein the plurality of pieces of information comprise at least one of first information received through a user interface of the electronic device, second information received from the walkie-talkie group, or third information received from an internal component of the electronic device.

20. An electronic device comprising:

a communication chip including a Bluetooth circuit that is configured to perform Bluetooth communication; and a processor including a plurality of intellectual properties (IPs) configured to perform a walkie-talkie operation with a walkie-talkie group by using the Bluetooth circuit, the walkie-talkie group including a plurality of Bluetooth devices, wherein at least two IPs of the plurality of IPs are configured to partitively control a plurality of operations for processing first walkie-talkie data received from the walkie-talkie group, and the at least two IPs are configured to alternately process the first walkie-talkie data.

* * * * *